US009961301B1

(12) United States Patent
White

(10) Patent No.: US 9,961,301 B1
(45) Date of Patent: May 1, 2018

(54) MODULAR COMMUNICATIONS SYSTEMS AND METHODS THEREFORE

(71) Applicant: Telepresence Technologies, LLC, Plano, TX (US)

(72) Inventor: Peter McDuffie White, McKinney, TX (US)

(73) Assignee: Telepresence Technologies, LLC, Plano, TX (US)

(*) Notice: Subject to any disclaimer, the term of this patent is extended or adjusted under 35 U.S.C. 154(b) by 0 days. days.

(21) Appl. No.: 15/783,901

(22) Filed: Oct. 13, 2017

Related U.S. Application Data

(60) Provisional application No. 62/408,444, filed on Oct. 14, 2016.

(51) Int. Cl.
*H04N 7/14* (2006.01)
*H04N 7/15* (2006.01)
*H04L 5/14* (2006.01)

(52) U.S. Cl.
CPC ............. *H04N 7/147* (2013.01); *H04N 7/15* (2013.01); *H04L 5/14* (2013.01)

(58) Field of Classification Search
CPC ............ H04N 7/144; H04N 7/15; H04N 7/14; H04N 7/142; H04N 7/157; H04N 13/0404; H04N 13/0434; H04N 13/0459; G03B 15/10
See application file for complete search history.

(56) References Cited

U.S. PATENT DOCUMENTS

| | | | |
|---|---|---|---|
| 7,057,637 B2 | 6/2006 | White | |
| 7,760,229 B2 | 7/2010 | White | |
| 8,208,007 B2 | 6/2012 | White | |
| 8,520,064 B2 | 8/2013 | White | |
| 8,599,239 B2 | 12/2013 | White | |
| 9,628,754 B2 | 4/2017 | White | |
| 2005/0237381 A1* | 10/2005 | White | G03B 15/10 348/14.16 |
| 2008/0012936 A1* | 1/2008 | White | H04N 7/144 348/14.16 |
| 2010/0238265 A1* | 9/2010 | White | H04N 7/144 348/14.16 |
| 2016/0004302 A1* | 1/2016 | Bolle | G06F 3/013 348/14.08 |
| 2016/0295170 A1 | 10/2016 | White | |

\* cited by examiner

*Primary Examiner* — Mohammad Islam
(74) *Attorney, Agent, or Firm* — Slater Matsil, LLP

(57) ABSTRACT

In a system and method for video communications, a user in an observation zone views a display image rendered on a vertically oriented screen through a two-way mirror in front of the screen. The two-way mirror is vertically angled at substantially 45 degrees, and reflects a part of a side wall in the observation zone. The backdrop for the light-emitting portion of the display image is provided by the reflection that is superimposed by the two-way mirror onto the non-light-emitting portion of the display image. The backdrop provides the light-emitting portion of the display image with a depth relationship that is observable when the user views the display image along a line of vision that extends straight through the two-way mirror to the screen behind the two-way mirror. A camera embedded in the side wall captures video of the user that is reflected by the two-way mirror from the observation zone back into the camera.

23 Claims, 14 Drawing Sheets

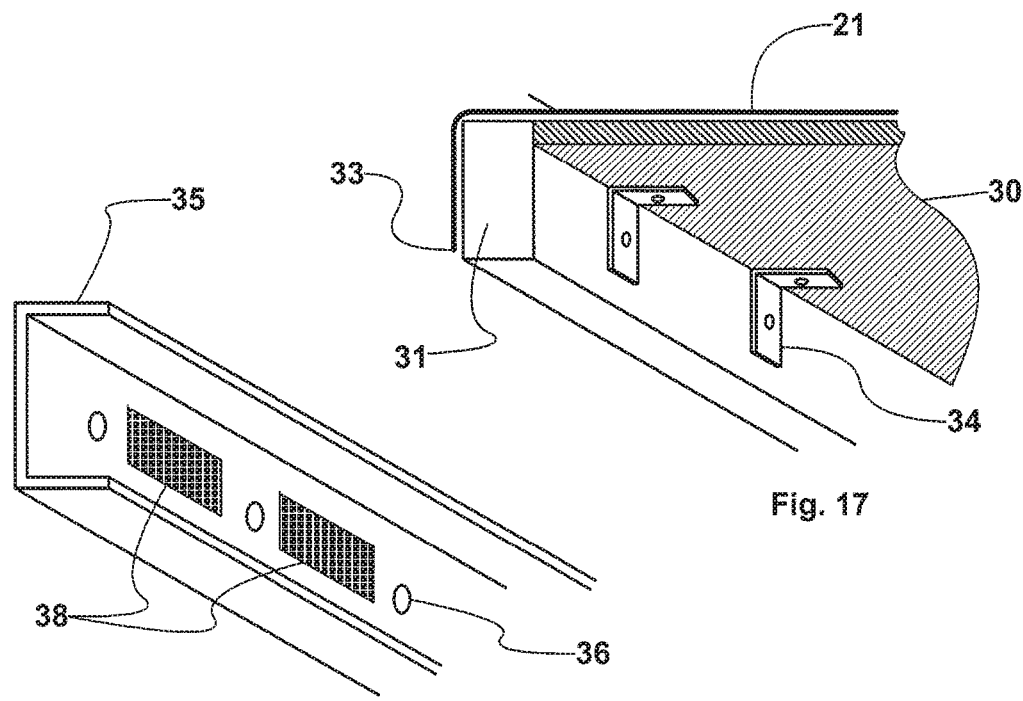
Fig. 17
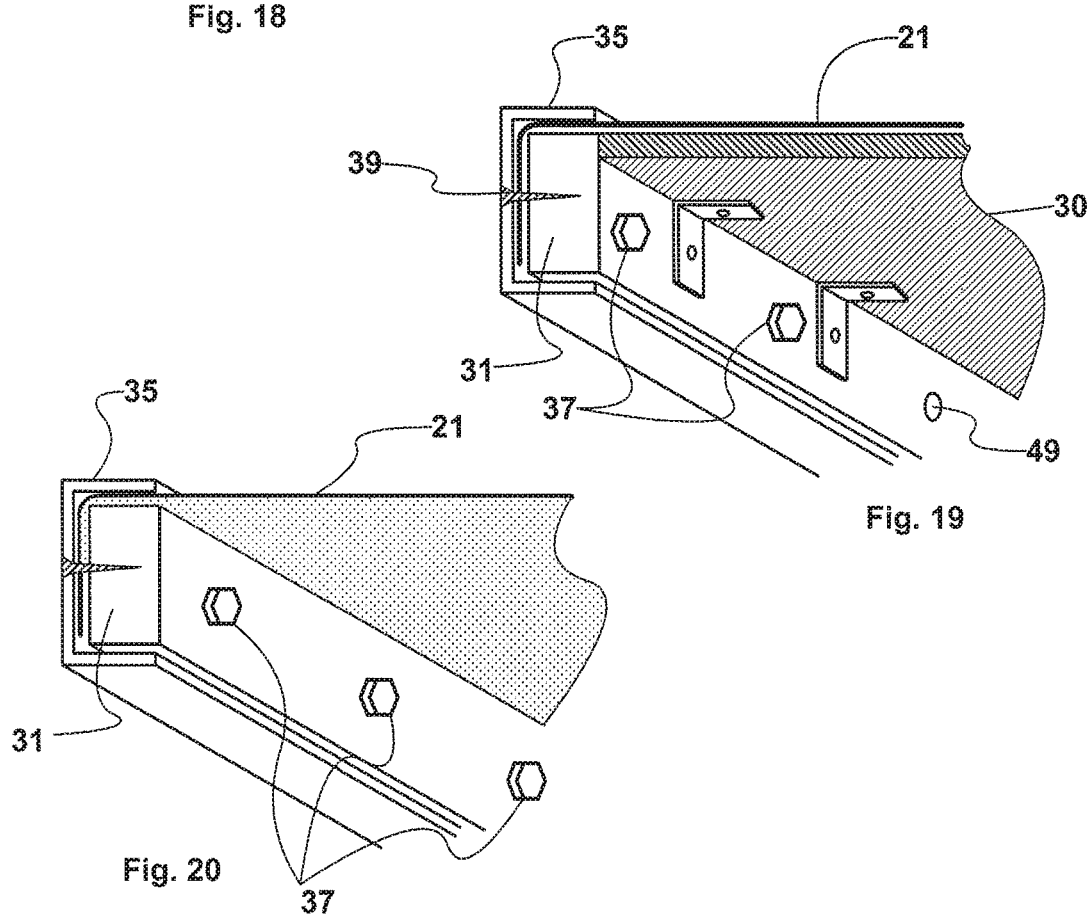
Fig. 18
Fig. 19
Fig. 20

Fig. 22 Customer searches for service
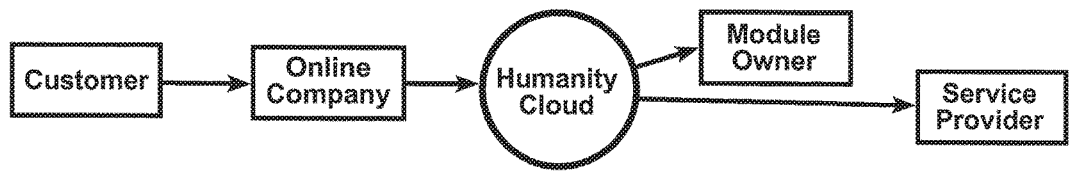
Fig. 23 Customer makes reservation
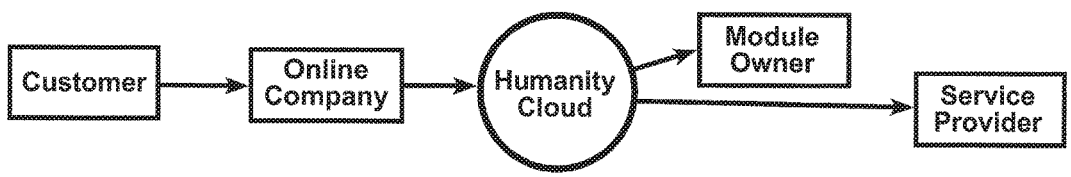
Fig. 24 Customer meets with Service Provider
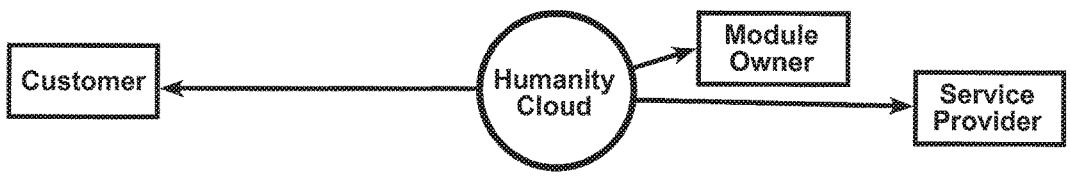
Fig. 25 Customer is charged for time with Service Provider
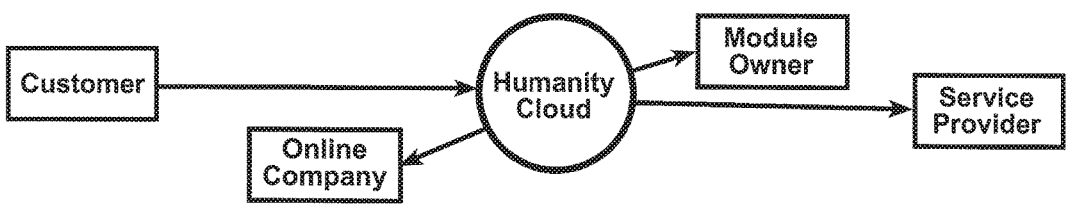
Fig. 26 Service Provider is charged for time with Customer
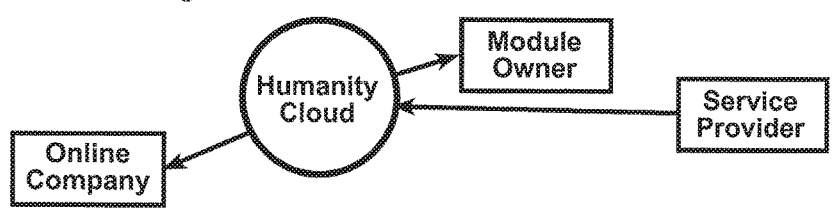

MODULAR COMMUNICATIONS SYSTEMS AND METHODS THEREFORE

CROSS-REFERENCE TO RELATED APPLICATIONS

This application claims the benefit of U.S. Provisional Application No. 62/408,444, filed on Oct. 14, 2016, which application is hereby incorporated herein by reference.

TECHNICAL FIELD

This present invention generally relates to a video conference system integrated into a self-contained module that can be delivered to locations where they are needed to accommodate users for engaging in live three dimensional video communication, and methods for utilizing same.

BACKGROUND

There is a need for an improved method for people to meet over a distance through video conferencing. Presently people go to a room with a video conference system comprised of a monitor with a camera placed above it. While this may provide a view of users in a remote location in a similar room, there is not a sense of presence of those users being in the same room.

Another common usage of video conferencing is for people to use a mobile device with an integrated camera to contact users in another location with a similar camera enabled mobile device. These live communications limit the view of the users to a small screen. The quality of the sense of presence with mobile devices is not adequate for many applications.

While it may be acceptable to have a poor sense of presence in distance communication, there are numerous applications where the sense of presence is critical. As an example, the more clearly a Doctor can see a patient, the better the Doctor can examine the patient. The Doctor's ability to examine and diagnose the patient is further enhanced if the Doctor can control and view the results of diagnostic medical devices in contact with the patient.

There is a need for an improved sense of presence in video communication that can be achieved in the physical interior space of a room that will optimize the communications experience.

Prior art solutions, including configurations described below, have achieved a 3D telepresence configuration within an architectural setting, however with certain shortcomings in the configuration that fall short of providing video conferencing services with a capability of providing a head-to-toe appearance of a life-size person to the user.

The prior art of FIG. 1 illustrates a side view of a room with a user 1 seated in a chair 8. A camera 6 views downward with an angle of view 9 along a horizontal axis through a two-way mirror 2 to a black panel 7. A view 10 reflected off the two-way mirror 2 captures an image of the user 1 with a black backdrop 13.

The prior art of FIG. 2 illustrates a user 1 seated in a chair 8 looking forward with an angle of view 11 toward a two-way mirror 2, horizontally angled downwards along a horizontal axis in the two-way mirror 2, for the user 1 to see an image display device 3 with a background provided by a superimposed image 5 of a reflected view 12 of an overhead backdrop panel 4 that is parallel to and in close proximity to the ceiling above the user 1.

The prior art of FIG. 3 illustrates a user 1 seated in a chair 8. A camera 6 views upward with a horizontal angle of view 9 through a two-way mirror 2 to a black panel 7. A view 10 reflected off the two-way mirror 2 captures an image of the user 1 with a black backdrop 13.

The prior art of FIG. 4 illustrates user 1 seated in a chair 8 looking forward with a horizontal angle of view 11 toward a two-way mirror 2 to see an image display device 3 with a background provided by a superimposed image 5 of a reflected view 12 of backdrop panel 4 that is parallel to and in close proximity to the floor beneath user 1.

The prior art of FIGS. 1 through 4 does not address the need to display a person head-to-toe within the limited footprint and limited height of a small room. These prior art configurations, with two-way mirrors that are angled along their horizontal axis, are limited to displaying the upper body of a person to the user, and capturing the upper body of the user to transmit back to the person at a remote location.

The prior art of FIGS. 1 through 4 incorporate a glass two-way mirror positioned at approximately 45 degrees to a horizontal orientation. This horizontally angled orientation limits the size of the two-way mirror due to sagging caused by gravity. It is difficult to use this horizontally angled orientation to achieve a solution to display a life-size image of a person head to toe.

The prior art of FIG. 5 illustrates a Peppers Ghost display configuration using stretched semi-reflective film 21, such as Mylar, to reflect an image projected on a screen 22 to appear as a superimposed image 23 on a stage 19. In the Peppers Ghost display configuration, the semi-reflective film 21 is angled along a vertical axis, however the configuration is not readily adaptable to provide a videoconferencing solution or an otherwise self-contained limited space solution.

Peppers Ghost creates the illusion of reflecting into the foreground, the images projected on a screen 22. The reflected images appear as the foreground of the objects or persons already positioned on stage 19. The audience is directly viewing stage 19, with whatever is positioned on stage 19, without a direct line of vision to the screen.

Peppers Ghost also requires a large space and complex structure in order to achieve the foreground illusion for the audience. In order to avoid using heavy and fragile materials, such as glass, a large backstage space is required to accommodate, not only the screen 22 and the semi-reflective film 21, itself, but also the structure that has to be built to tightly stretch semi-reflective film 21 in order to achieve a flat plane that provides a more realistic foreground illusion. As an example, one prior art method for stretching film 21 is achieved by pulling the film 21 from a roll 24 with a clamp 26 that is tightened with strap 27 that is connected to a truss 25. A strong truss structure 20 is erected to withstand the amount of tension to adequately stretch the film 21 in the Peppers Ghost application. The rigid truss structure 20 minimizes the sagging of the film 21 that will naturally happen by gravity since it is angled at approximately 45 degrees to the floor.

The prior art of FIG. 6 illustrates a method from holding the film 21 for the process of stretching. The film 21 is positioned in a clamp 26 that is held tightly together to hold the film 21 using bolts 28. The clamp 26 is pulled to stretch the film 21 with a strap 27 that is connected to a truss 25 and tightened with connector 29.

The method of FIGS. 5 and 6 for achieving a reflected image for the three dimensional visual effect cannot fit within a small room or self-contained module.

The truss structure 20 and the distance required for clamping the film 21 with straps 27 take up too much room to be practical in the small space of a self-contained module or small room or space. The self-contained module may be the height and width of a standard cargo container and a small room may be the size of a standard sized office or an exhibition hall in a museum. The dimensions of the module may vary depending on the structure containing the module, but they may be within a range of 7' to 9' high, 7' to 9' wide and 12' to 24' in length.

The prior art solutions are complex to install, require larger space, and are unable of being effectively implemented in a self-contained module that could be delivered to locations of need to provide video conferencing services with the three-dimensional appearance of a life-size person viewed head-to-toe.

SUMMARY

An embodiment module is self-contained, and may incorporate equipment in a video conference system, that is connected with other equipment in a video conference system, to enable face-to-face communications over a distance. This may involve a person initiating the video conference that may be called the "Presenter". The person receiving the incoming video of the Presenter may be called the "Receiver". Once the video call is established, the Presenter and the Receiver may engage in a live, two-way interaction in real time.

According to some embodiments, the Receiver will stand or sit in the module while the Presenter will appear as a transmitted live video image. The Presenter may be viewed by a camera in a transmission system that may use a two-way mirror to align the camera view with the line of sight for an apparent eye contact with the Receiver and to achieve a three dimensional visual effect by reflecting a backdrop to appear a distance behind the displayed Presenter. The resulting communications solution of a life-size person appearing in a room in a three dimensional form without 3D glasses or a headset may be called, in some embodiments, "Holographical Reality™".

A computer with a software codec or a hardware codec may be used to transmit the video in high definition and the image display device may display the image of the transmitted Presenter at the Receiver location in high definition. The system at the Receiver's module may have an image display device, including a screen adapted to display or otherwise render the incoming image of the Presenter at life-size or near life-size to the Receiver in the module. The system that is both in and connected to the module, may incorporate a two-way mirror in the module to reflect a backdrop image to appear on a plane positioned a distance behind the plane of the image display device so that the superimposed image provides a depth cue that may be perceived by the Receiver as causing the displayed Presenter to appear three dimensional within the setting of the physical space of the module, that is observable as a true measurable depth.

The module may be a custom designed and installed interior of a room with the configuration to achieve the visual communications solution. The module may include a set of prefabricated panels and components that may be shipped to a site as a package. This module may be designed to be easily and quickly assembled for usage. The module may be a room that can be transported or shipped. This module may be the three dimensional space within a box truck, the interior of a mobile home, the volume of a trailer or the interior of a shipping container. The modules could be shipped to locations around the world as a cost effective solution for a self-contained module ready to operate in a video communications system.

One advantage of providing the system in a self-contained module is that it easily integrates the system into the physical space of a unit that may be moved to the locations where they are needed. These modules may be connected through a telecommunications network to a server or number of interconnected servers to provide a network of connections between modules. The application of this invention in the role of connecting all of humanity in an advanced form of communication may be referred to as "Humanity Modules™".

As the Lunar Module was a giant leap for mankind during the Space Race, this system can be a giant leap for mankind in cyber space. In the era of the Space Race, technologies advanced rapidly to achieve the mission of reaching the moon. Today technologies are advancing rapidly in cyber space to connect billions of people through the Internet on global networks with social media and search engine links.

It will be a small step into the modules that will span space and time as a giant leap for mankind. It is within the modules that people can meet as life-size beings within the same three dimensional physical spaces to interact in real time. By breaking geographical barriers of distance, people can come together at any time without physical travel.

In the modules, people can have social and intellectual engagement in a natural human way. Unlike the constraints of the phones, monitors, tablets, and other flat screens, the modules digitally generate the embodiments of people at their full life-size to appear three dimensionally while achieving eye contact for real time interaction. It is the modules that are the culmination of the advancements in global communications to achieve the giant leap for mankind.

This invention may be developed into a network of hundreds of thousands of modules to connect people around the world through a cloud-based communications network.

The method for the delivery of professional services using modules may be connected by a cloud-based communication service that may incorporate specific technical processes, equipment specifications, systems configurations and methods of operation, all further discussed herein.

BRIEF DESCRIPTION OF THE DRAWINGS

For a more complete understanding of the present invention, and the advantages thereof, reference is now made to the following descriptions taken in conjunction with the accompanying drawings, in which:

FIG. 17 illustrates a detail of the structure of the form for stretching semi-reflective film, according to some embodiments;

FIG. 18 illustrates a metal extrusion for the edges of the form for stretching semi-reflective film, according to some embodiments;

FIG. 19 illustrates the metal extrusion in position on the form, according to some embodiments;

FIG. 20 illustrates the form with the interior panel removed and the frame bolted to the surrounding structure of a module, according to some embodiments;

FIG. 22 illustrates a process for customers to search for a service to be provided in a module, according to some embodiments;

FIG. 23 illustrates a process for customers to make reservations for services in a module, according to some embodiments;

FIG. 24 illustrates a process for customers to meet with a service provider in a module, according to some embodiments;

FIG. 25 illustrates a process for customers to be charged for services provided in a module, according to some embodiments;

FIG. 26 illustrates a process for service providers to be charged for services provided to customers, according to some embodiments;

DETAILED DESCRIPTION OF ILLUSTRATIVE EMBODIMENTS

Figure 1:
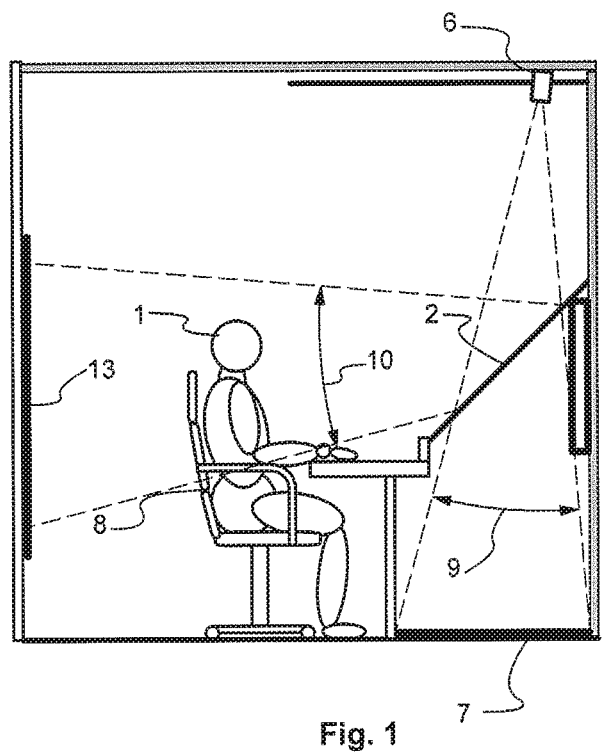
FIG. 1 illustrates a prior art configuration of a system with a camera overhead viewing the user as a reflection off a two-way mirror.
Figure 2:
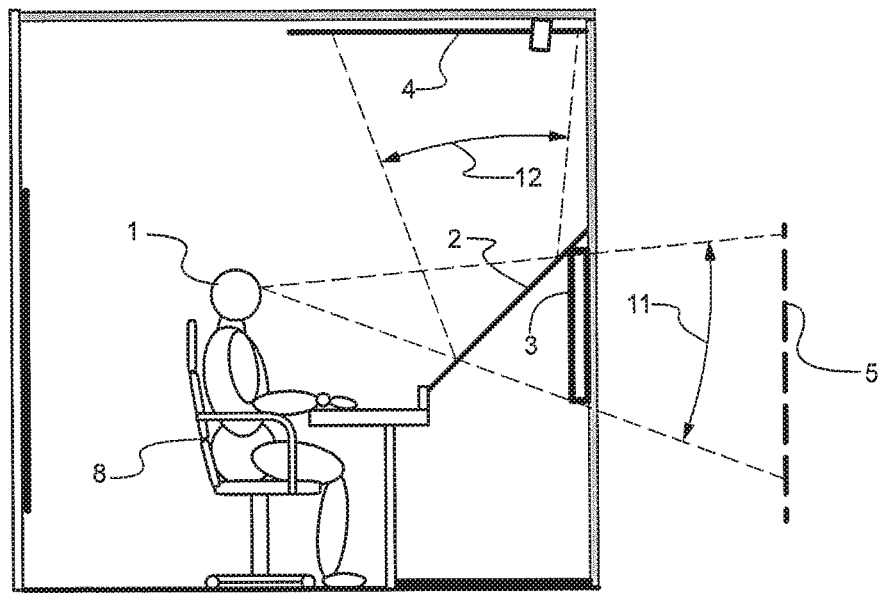
FIG. 2 illustrates a prior art configuration of a system with a reflection of the ceiling as viewed by a user.
Figure 3:
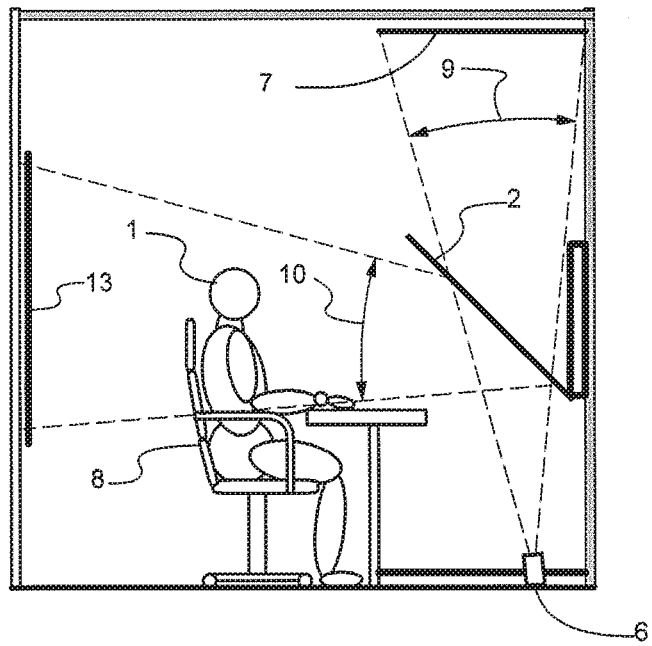
FIG. 3 illustrates a prior art configuration of a side view of a room with a system with a camera close to the floor viewing the user as a reflection off a two-way mirror.
Figure 4:
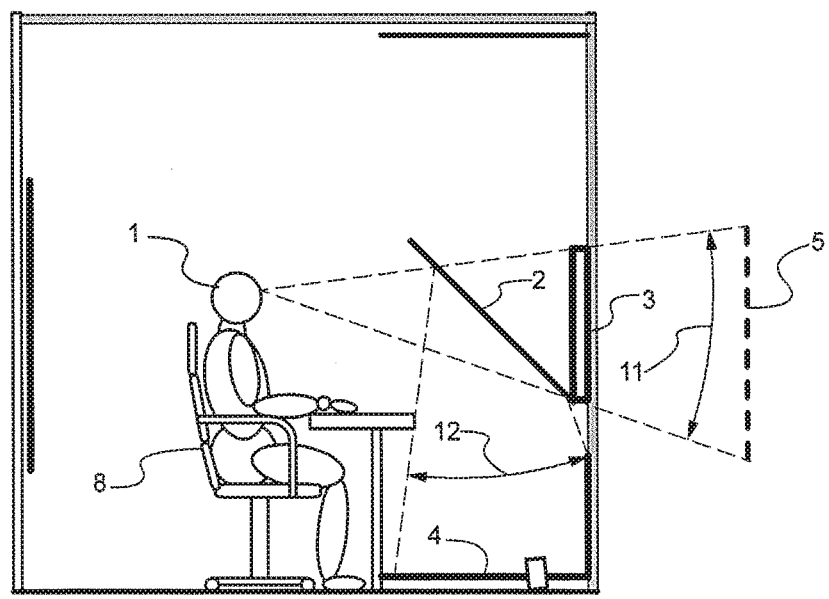
FIG. 4 illustrates a prior art configuration of a side view of a room with a system with a reflection of a panel in close proximity to the floor as viewed by a user.
Figure 5:
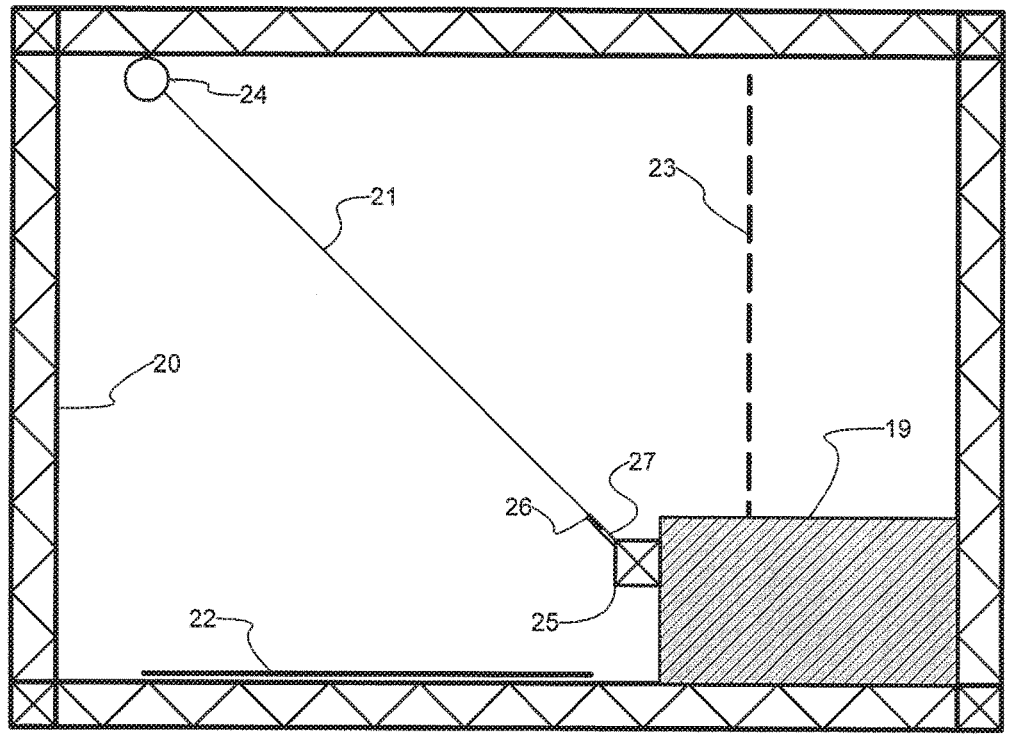
FIG. 5 illustrates a prior art configuration of a Peppers Ghost display system with a stretched semi-reflective film held at an angle with a truss structure.
Figure 6:
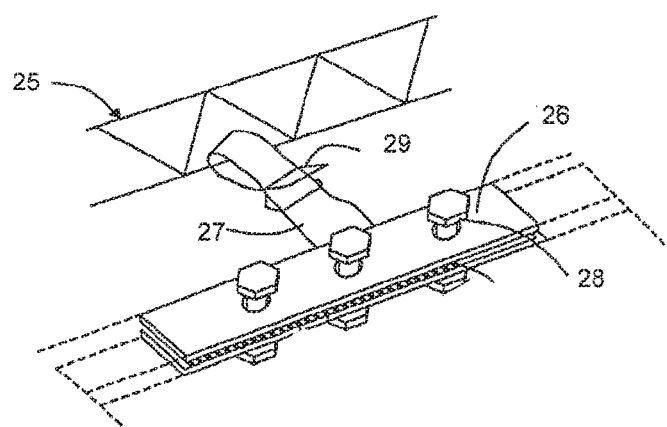
FIG. 6 illustrates a prior art configuration of a clamp system to stretch semi-reflective film within a truss structure, according to an embodiment of a Peppers Ghost display system.

The following disclosure provides different embodiments, or examples, for implementing different features of the subject matter disclosed herein. Specific examples of components and arrangements are described below to simplify the present disclosure. These are, of course, merely examples and are not intended to be limiting. In addition, the present disclosure may repeat reference numerals or letters in various examples. This repetition is for simplicity and clarity of discussion, and does not in itself dictate a relationship between various embodiments or configurations. Therefore, various changes, substitutions, or alterations can be made herein without departing from the spirit and scope of the appended claims.

According to some embodiments, modules ("Modules") transmit display images, such as videos to users who are sitting or standing in the observation zones inside them. The Modules may also capture video of the user inside and transmit the captured video to other Modules, or otherwise to locations remote from the user. The Modules include the system that provides video display, capture, transmit and communicate capabilities, as described further below. The Modules may be located at many international locations and connected to the Internet to achieve an international network of Modules. These Modules may be located in museums, universities, civic centers, shopping malls, retirement communities, country clubs, military installations, schools and many spaces that are accessible to the public. The Modules may provide a space for people to meet face-to-face with people of other cultures. These Modules may provide a window on humanity and create a better understanding between people around the world. According to some embodiments, these Modules may be referred to with a name, e.g., "Humanity Modules." The Modules may be connected to a global cloud based service that may be called the "Humanity Cloud," according to some embodiments.

U.S. patents and patent applications listing the inventor, under common ownership with this application, that include descriptions related to the Modules and the system incorporated in the Modules and connected to the Modules, are incorporated herein by reference, as follows (with further exemplary details provided below): U.S. Pat. No. 7,057,637, entitled "Reflected Backdrop for Communication Systems," issued on Jun. 6, 2006 ("the '637 patent"); U.S. Pat. No. 8,208,007, entitled "3D Displays and Telepresence Systems and Methods Therefore," issued Jun. 26, 2012 ("the '007 patent"); U.S. Pat. No. 7,760,229, entitled "Reflected Backdrop for Communication Systems ," issued on Jul. 20, 2010 ("the '229 patent"); U.S. Pat. No. 8,599,239, entitled "Telepresence System and Methods Therefore," issued on Dec. 3, 2013 ("the '239 patent"); U.S. Pat. No. 8,520,064, entitled "Visual Displays and TelePresence Embodiments with Perception of Depth," issued on Aug. 27, 2013 ("the '064 patent"); U.S. Pat. No. 9,628,754, entitled "Architectural Scale Communications Systems and Methods Therefore," issued on Apr. 18, 2017 ("the '754 patent"); and U.S. patent application Ser. No. 15/090,490 filed on Apr. 4, 2016 and entitled "Architectural Scale Communications Systems and Methods Therefore".

According to some embodiments, the Modules may include microphones to capture audio from the observation zone inside the Modules, as well as cameras to video the user inside the Modules. The Modules may include a speaker to broadcast audio into the Modules. Audio technology, such as full-duplex could be used in some embodiments, so that sound being broadcasted into the Module is not interrupted by sound being captured and transmitted from the Module. A further description of the equipment that may be included in the Modules, to enable video conferencing, according to some embodiments, is described in the '754 patent, at col. 5, lines 1 to 49, incorporated herein by reference.

"Holographical Reality™" is a trademarked term that expresses a sense of reality with imagery generated to appear three dimensionally within a physical real-world environment as large as a room without 3D glasses or goggles, including the appearance provided by the Modules, such as the Humanity Modules. According to some embodiments, the visual effect is related to three dimensional imagery of holography. However, this visual effect is not limited to the image area of a sheet of holographic film.

Star Trek introduced the "HoloDeck" as a room where three dimensional settings could be generated to appear as a reality through a technology related to holography. The science fiction series featured this holographical sense of reality in many of its productions.

The appearance of Princess Leia in Star Wars is another example of a projected holographical sense of reality. Numerous other movies have shown forms of a holographical sense of reality that have captured the imagination of their audiences.

Contrary to science fiction representations, these visual effects cannot be achieved with existing technologies using holographic film. However, the portfolio of patents by inventor, Peter McDuffie White, generates both 3D graphic animation and life-size transmitted people appearing within a physical, real world environment for viewing without 3D glasses or goggles.

The Module, that includes the system connected to the Module, both inside and outside the Module provides three-dimensional imagery for one or more users in a physical real-world environment without equipping the user with extra technology to achieve the effect, such as 3D glasses, goggles, headsets or other devices. The environment in the Module incorporates (and the Module includes) a semi-reflective beam-splitter. The beam-splitter, according to some embodiments, may be included in a two-way mirror.

Alternatively, in some embodiments, the beam-splitter may be referred to as a two-way mirror. The two-way mirror includes beam-splitting properties, in addition to the having the transparent and semi-reflective properties of a two-way mirror, as images are projected through the two-way mirror.

Other embodiments may include a beam-splitter that is part of the image display device that is rendering and projecting a display image onto the two-way mirror, or the beam-splitter may be separate from both the image display device and separate from the two-way mirror, or there may be an additional beam-splitter between the image display device and the two-way mirror.

According to some embodiments, the two-way mirror refers to any planar surface with a degree of transparency and reflectivity. The two-way mirror, described further below, may comprise, in some embodiments, glass or plexi-glass, or plastic, or stretched film, with a semi-reflective substance applied to an outer surface that faces a user inside the observation zone in a Module, when the user is facing the two-way mirror. Or the material comprising the two-way mirror may be manufactured to already have the properties for a certain amount of beam-splitting, transparency and reflectivity.

The two-way mirror allows for both a direct view of the physical setting and a reflected view of a portion of the scene. On the opposite side of the two-way mirror is a high resolution digital display technology that generates imagery to be within view of the users. The users view through the two-way mirror to directly see the generated imagery superimposed with the reflected view of the scene positioned at a further distance behind the plane of the imagery for a true physical depth relationship.

According to some embodiments, the depth relationship provided by the two-way mirror over a traditional hologram, has an advantage, because the Module gives the visual effect on a standard photographic recording of a light field, without requiring a special type of image formation by a specifically configured lens.

A traditional hologram also displays an image of the holographic subject within the boundaries of the holographic film that has a three-dimensional effect without the aid of 3D glasses. The depth can extend in front and in back of the plane of the holographic film. However, the holographic image in only visible within boundaries of the holographic film and the image do not extend outside of the edges of the film. A hologram is an exposed sheet of film with an embedded image, which cannot be changed for displaying multiple images to generate a motion picture. Furthermore, the exposed film does not allow for the display of a live video presentation.

In contrast, the Module is not restricted to the edges of a sheet of film and it can display both recorded video content and live video communication. The visual effect created by the Module has the qualities of three-dimensional imagery without requiring 3D glasses or goggles. The holographical effect is achieved by using a beam-splitter, such as a two-way mirror, to directly view a digitally generated imagery within a superimposed physical real-world setting.

The Module also has advantages, according to some embodiments, over Virtual Reality that displays computer environments generated in two views to be displayed on left and right screens of a headset for the user to see the stereoscopic imagery. The user views a simulated environment in the headset. By comparison, the Modules can display both live transmitted video of life-size people and computer generated objects to appear digitally generated as embodiments appearing three dimensionally within physical real-world spaces. The user can experience the depth relationship with real physical and measurable depth without wearing or using any other devices. Also, the depth relationship can be experienced by multiple users. There is no single user limit, unlike Virtual Reality that is limited to individual users wearing virtual reality headsets. Small groups and even large audiences can experience the depth relationship in the Modules at the same time.

According to some embodiments, the Modules have advantages over Augmented Reality. Augmented Reality refers to a direct or indirect view of a physical real-world environment whose elements are augmented by computer-generated sensory input such as sound, video, graphics or GPS data. As a result, the technology functions by enhancing one's current perception of reality. A head-mounted display (HMD) is paired to the forehead such as a harness or helmet. HMDs place images of both the physical world and virtual objects over the user's field of view. Other methods of achieving Augmented Reality are under development, such as contact lenses that display Augmented Reality imaging and a virtual retinal display that is scanned directly onto the retina of a viewer's eye.

By comparison to Augmented Reality, the depth relationship for display images provided by the Modules can be experienced by people without requiring a headset or other impediments. The user-experience can be enhanced in some embodiments, when the display images that are generated are images of people at life-size or near life-size in a room.

According to some embodiments, the Modules have advantages over autostereoscopic technologies. Autostereoscopic technologies generate three-dimensional stereoscopic imagery that can be viewed without 3D glasses. The usage of lenticular arrays has been commercially developed and mass produced for television screens to simultaneously display multiple views offset horizontally for creating stereoscopic imagery for the users. Other technologies using holographic film and diffractive light fields have been successful in generating autostereoscopic imagery on small screens.

By comparison to autostereoscopic technology, the Modules do not have a visible frame confining the image within the viewing environment. In the Modules, images appear within a physical, real-world environment without a visible frame of a display screen. Since there is not a visible frame, the images appear to be superimposed within the view of the users at a physical distance in front of a reflected environment provided by the beam-splitter, such as the two-way mirror.

The Modules have many advantages over a Peppers Ghost display. The Peppers Ghost display is a theatrical effect using a large sheet of semi-reflective glass or film that has been used to reflect an image of a person to appear as a foreground image on a stage. The reflected image appears as a semi-transparent image projected into a foreground of a stage, so that it appears as a ghost in the foreground. This technique is used today in amusement parks and stage productions with improved control of the lighting and image display to achieve dramatic effects using semi-reflective Mylar film. These Pepper's Ghost configurations have a display screen in the same physical space of the users with the semi-reflective film positioned to reflect the projected imagery as foreground, to the background stage in direct view of the audience. This configuration requires that the room lighting is as black as possible to avoid washing out the display screen. Also, the configuration greatly limits the viewing angle of the scene since the display itself could be seen within the same room.

By comparison to Peppers Ghost displays, the display technology in the system incorporated into and connected to the Modules is positioned behind the two-way mirror. The two-way mirror superimposes a backdrop onto the non-light emitting portion of the imagery. The backdrop appears to be behind the light-emitting portion of the displayed imagery, for the user standing in front of the two-way mirror. The perception of the backdrop being behind, provides a three-dimensional view of the light-emitting portion of the displayed imagery. The direct view of the display technology, that includes the display imagery rendered on the screen behind the two-way mirror, eliminates the "ghost" effect of the light-emitting portion of the display imagery, in contrast to the "ghost" effect of the projected reflection into the foreground, in a Pepper's Ghost display.

Social media, like Facebook®, have made it possible for people to make connections on a global scale. While these social networking sites are achieving a significant advancement in communication, they are limited in their value. People still want to meet face-to-face on a social basis. The social networking sites only exist in cyber space. The only physical connection is through images on a screen of a phone, tablet or other display device. When it comes to meeting with people, the social media sites provide no physical presence. Even though people can connect through social media and establish communication around the world, the distances between people still exist. This dilemma makes it impractical and sometimes virtually impossible for people to meet in person. The Module, according to some embodiments, provides a solution for people to meet in the same space, even though they are physically in different parts of the world.

Professional network companies, like LinkedIn®, generate their income by charging for services that provide selective access to its members. It cost more to be able to have the contact information for business prospects. However, the professional network companies do not have the means to delivery professional services. There is a far greater opportunity for professional networking companies to manage the delivery of these professional services. They can generate income by scheduling people to meet at Modules through the cloud based services, such as what may be referred to, in some embodiments, as the "Humanity Cloud."

Even though a search engine can provide users with information, it is limited in delivering professional services. As an example, companies are willing to pay a cost per click for potential customers to view their pop-up or embedded ads on the website. However, the advertisers are not receiving any direct income to cover their cost. It is only the hope that the potential customer will be motivated to then contact the company about their products or services. The Module provides a means for companies to actually deliver their professional services. Customers can go to the closest Module to meet in person with a professional for services, such as financial service, legal advice, consulting, etc. Instead of simply generating income from a cost per click for an ad, the search engine company could generate income for a cost per service.

Search Engine companies, such as Google®, do not have any physical presence in the commercial world. One might consider that this is an advantage in that there is no investment in brick and mortar locations. However, there is also no foundation for delivering professional services. There is no need for e-commerce or search engine companies to own the Modules. Instead, they could become the source connecting Modules together. By becoming the source for access to billions of users, all professional services could be promoted and reserved by search engine and e-commerce providers. The providers could then take a fee of the charges for the professional services delivered at the schedule meetings at Modules.

As one business application for this invention, the Presenter may be a Doctor and the Receiver may be a patient. This business application may provide medical and consultation services that may be called "Doctors on Call" or "DOC" for short. The solution may be promoted under the term "DOC Module™" according to some embodiments. There may be thousands of DOC Modules providing telemedicine services through a cloud based service.

According to some embodiments, a DOC Module may be a typical size exam room of 8'×12' where the physician may be on camera to be transmitted to another DOC Module with a patient. The physician could meet a patient appearing at life-size within the three dimensional setting of the room (without needing to wear 3D glasses) while making eye contact for real time interaction.

The DOC Module may be a portable exam room that could be transported to underserved health care locations. The DOC Module may be available as a prefab set of panels that could be quickly assembled in an available building during an emergency event. The interior lighting, video conference display and diagnostic equipment may operate with a single 10 amp power supply and may gain access to the Internet for live video communication either by a relatively low bandwidth Internet connection or a 4G wireless network. In remote locations the Module could be receive video communication with the usage of a satellite dish.

With a DOC Module, care may be provided without a full hospital staff of specialists on site, even at the medical provider end, because the DOC Module could access a virtually unlimited resource of other doctors and staffing via video conferencing. Compared to maintaining a brick and mortar hospital, the cost of the DOC Module may be minimal.

Another application of a Module may be for providing an advanced communications solution for people to share their faith in their religion. This application of a Module, that may be referred to as a Humanity Module™ may be called a "Faith Module" in some embodiments. A Faith Module may be installed within a church to provide the members of the church with a direct line of communication to the leaders of the regional, national and global religious institution. The Faith Module may be used for religious training, counseling and management. The Faith Module may be used by the ministers to pray with those in need. Faith Module may be in a trailer, truck or other mobile arrangement that would allow it to be moved to locations on a temporary basis for serving members of the church and promoting for getting new members to their church. The Faith Module may be contained in a shipping container that could be shipped to remote parts of the world to proselytize for their religion. Faith Module may be used by missionaries to help spread the faith and provide the missionaries with direct communication to their religious leaders. The Faith Module may have a wireless network connection or satellite communications system for two-way live video communication.

Another application of the Module may be for usage in the event of an emergency. This may be undertaken as the "Humanity's Emergency Lifeline Project" (HELP), according to some embodiments. The HELP Module may be contained in a mobile structure, such as a truck, trailer or shipping container. The HELP Module may include medical supplies and medical diagnostic equipment for remotely located doctors to see patients and direct medical procedures. The HELP Module may include seating for families to receive counseling and guidance to address their needs. The HELP Module may have a supply of medications that could be dispensed to individuals meeting with psychiatrists to address mental problems. The HELP Module may provide an essential method of helping people during a pandemic when people with a contagious disease may need treatment and it is not advisable for doctors to enter the area.

Another application of the Humanity Module may be establishing communication between people in countries and cultures for the betterment and understanding of our global community. This may be undertaken to achieve "Humanity's Opportunities for Peace and Empathy" (HOPE), according to some embodiments. A HOPE Module may be a prefabricated structure that is shipped to an international location and assembled within a government agency, university, museum, cultural center or other publically accessible building. The HOPE Module may be in a shipping container that could be shipped to any location in the world to be placed in a location that is accessible to people in that community. The HOPE Module may allow a free flow of people to enter the Module to see and hear people on the other side of the globe. The live two-way communication between people may help to break down preconceptions and find common human nature even between cultural differences.

Another application of the Modules in some embodiments may be to connect people with work opportunities. This may be undertaken to address "Jobs, Organizations and Businesses" (JOB). A JOB Module may be installed in an existing room in a building or incorporated into the architectural design of a new building. The JOB Module may be a prefabricated structure that may be assembled for a temporary or semi-permanent room placed within an environmentally controlled environment. The JOB Modules may be a mobile unit that could be moved to a location for the duration of its need for applications for new jobs or supporting a business communication need. The JOB Modules may be used for job applicants to meet with employers for job interviews. The JOB Modules may be used in organizations for ongoing human resources evaluations and management briefings. The JOB Module may be located at universities and institutions of higher learning as a resource for students seeking employment. In addition to incorporating the communications and display technology to see and hear life-size people, the JOB Modules may include computers or other communications devices for testing skills and conducting evaluations.

Another application of the Modules may be to provide potential customers with direct access to professionals that may not be within their area. This may be undertaken to provide communication with "Professional Resource Organizations" (PRO) in some embodiments. The PRO Modules may be placed in a store, such as Lowes or Home Depot, to provide a direct line of communication with manufacturers of high value products. A potential customer considering the purchase of an expensive appliance or remodeling project may be able to meet through the Module to gain a better understanding of the advantages of the product and make a buying decision. The PRO Modules may within a professional services building in a community to provide direct access to professionals from regional, national and international business centers. The PRO Modules may incorporate seating and a desk for people to meet for professional services, such as legal advice, financial planning, family law, real estate, stock market investments, etc.

Another application of the Modules may be to connect educational institutions to extend the learning opportunities for students. This may be undertaken for "Worldly Interaction for Schools and Education" (WISE), according to some embodiments. WISE Modules may be located within buildings on an educational campus. WISE Modules may be used for tutoring that could draw upon a national resource of tutors. WISE Modules may be used internationally for language training for students to meet through the Modules, to not only learn the language of people from another part of the world, but to gain a sense of their personality and character.

Figure 7:
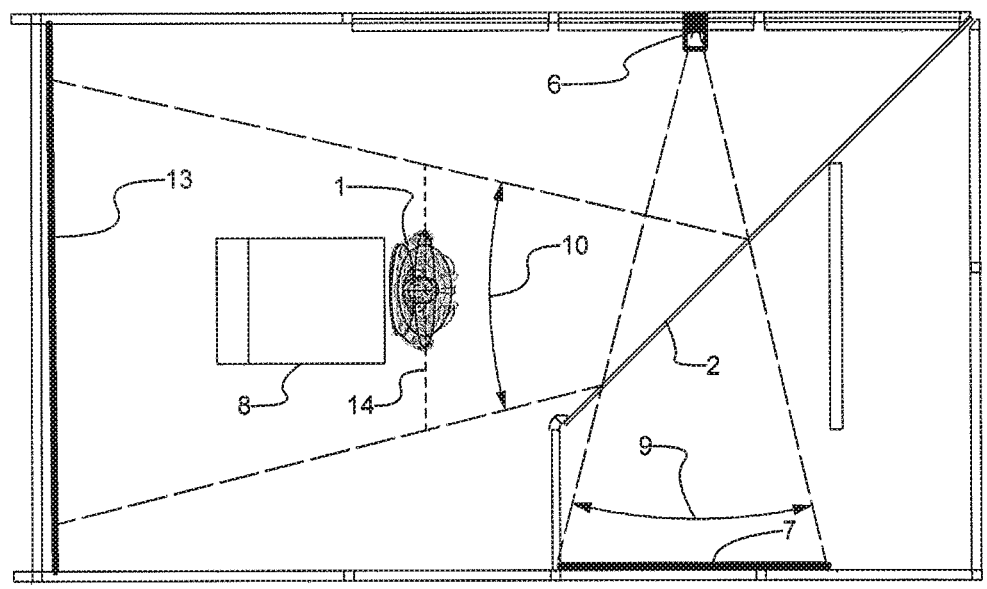
FIG. 7 illustrates a plan view of a module with a communication system, with a two-way mirror positioned vertically in an orientation for a camera viewing a user as a reflection off a two-way mirror, according to some embodiments.

FIG. 7 illustrates a plan view, according to some embodiments, of a Module with a user 1 standing in front of a chair 8. A camera 6 is positioned with an angle of view 9 through a two-way mirror 2 to view a black panel 7 and a reflection off the two-way mirror 2 in a view 10 to view a user 1 at plane 14 and a black panel 13 positioned behind the user 1. The camera 6 may have a microphone embedded with the image capturing technology in the camera 6. The microphone is adapted to capture sound from the observation zone in the Module, while the image capturing technology in the camera 6 captures an image of the user 1 reflected back into the camera 6 by the two-way mirror 2. When the user 1 is standing in the plane 14 the camera 6 will capture the image of the user 1 to be the right size for displaying at an image display device in a different Module at the right enlargement to appear to be life-size. For example, if the user 1 is six feet tall in reality, the user 1 will appear to be six feet tall in the different Module.

Figure 8:
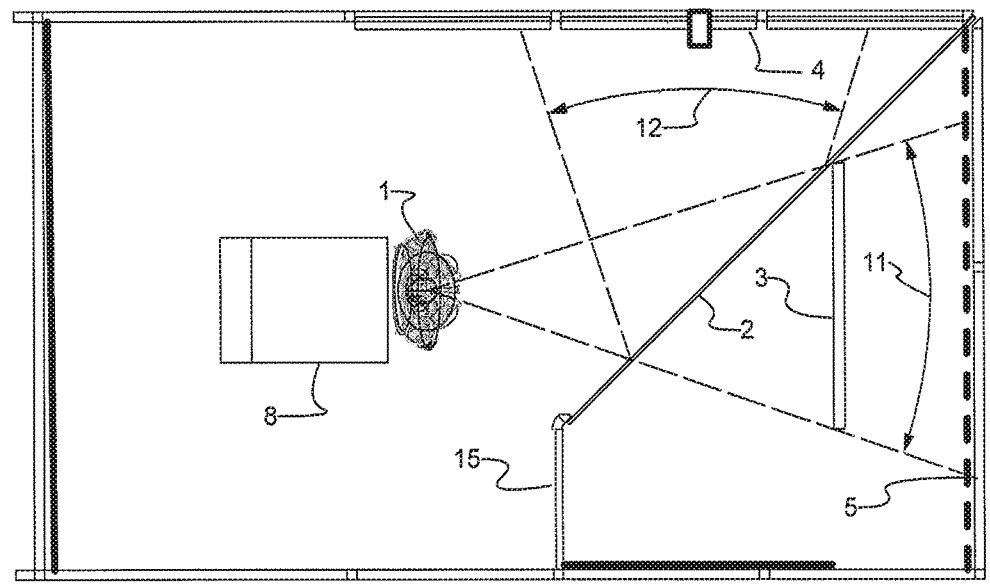
FIG. 8 illustrates a plan view of a module with a communication system, with a two-way mirror positioned vertically in an orientation to reflect a side wall as a reflection off the two-way mirror, according to some embodiments.

FIG. 8 illustrates a plan view, according to some embodiments, of a Module with a user 1 with an angle of view 11 seen through a two-way mirror 2 to see an image display device 3 with a reflected view 12 of a side wall 4 that will appear when looking forward as a superimposed image 5. The reflection is superimposed onto the non-light-emitting portion of the display image rendered on the screen in the image display device 3, providing a backdrop that appears in the superimposed image 5, as being behind the light-emitting portion of the display image rendered on the screen in the image display device 3 and projected through the two-way mirror 2, along the line of vision of the user 1, that can any axis within the angle of view 11, extending straight through the two-way mirror 2 to the image display device 3 behind the two-way mirror 2.

An example of providing the depth relationship for the light-emitting portion of a display image, along a line of vision straight from user 1 to the screen in the image display device 3 behind the two-way mirror, according to some embodiments, is illustrated and described in the '064 patent, as the line of sight 16 through a two-way mirror that is horizontally angled, in FIG. 20, and at col. 10, lines 5-33, incorporated herein by reference.

Figure 30:
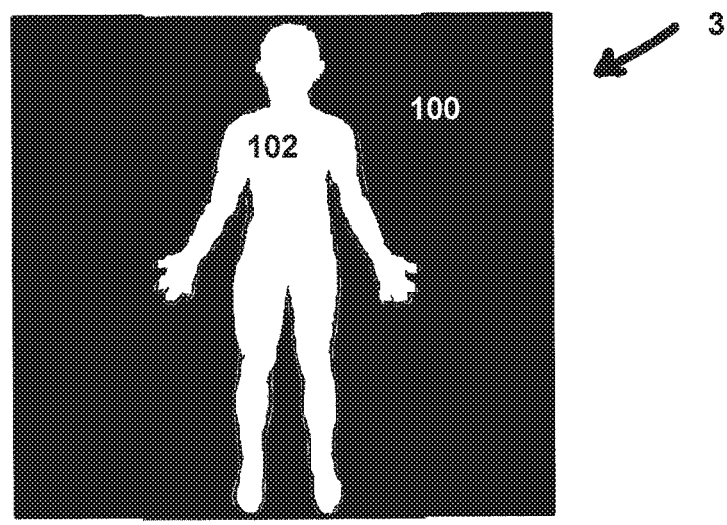
FIG. 30 illustrates a display image rendered on a screen of an image display device, according to some embodiments.

FIG. 30 illustrates, according to some embodiments, a display image rendered on a screen of an image display device 3. The light-emitting portion 102 is the image of a person. The non-light-emitting portion 100 is a black background. The reflected view of the side wall 4 in FIG. 8, is superimposed as the backdrop over the non-light-emitting portion 100 of the display image, providing a depth relationship for the light-emitting portion 100, that is observable, when the user 1 views the display image through the two-way mirror 2.

Returning to FIG. 8, the two-mirror 2, according to some embodiments of the present invention, is vertically angled, at approximately 45 degrees to the side wall 4, as shown, so that the reflection of the side wall 2 will appear at 90 degrees to the side wall 2 as if it was the back wall of the room. The side wall 4 may have acoustic properties to minimize reverberation in the room and improve the quality of sound in the room. Other surfaces, such as the other walls, ceiling and floor may have acoustic properties to dampen reverberation in the room.

An example of how a reflection superimposed by the two-way mirror 2, according to some embodiments, can appear as a backdrop for the light-emitting portion of the image being projected through the two-way mirror 2, is described with respect to a two-way mirror that is horizontally angled, in the '637 patent, at col. 8, line 5 to col. 9, line 18, and related figures, incorporated herein by reference.

According to some embodiments, the observation zone includes the angle of view 11 of the user 1, and may refer to the area between the two-way mirror 2, side wall 4, the wall opposite side wall 4, the black panel 13 on the back wall, and the door 15. In general, the observation zone refers to the zone in which the user can be sitting or standing upright in the Module and able to view the screen in the image display device 3 straight through the two-way mirror 2. In other embodiments, if there is a side region on either side of the observation zone, the observation zone is bordered by the side regions on either side, instead of side wall 4 and the wall opposite side wall 4.

According to some embodiments, the display image on the screen in the image display device 3 may be a video of an operator captured live at a remote location and transmitted through a communication system connected or otherwise in communication with the image display device 3 in the Module. In other embodiments, the display image may comprise a pre-recorded video or a still image of an object or person, such as the visual content, and the technology and equipment enabling the transmission and rendering of the visual content described in the '754 patent at col. 9, line 57 to col. 11, line 3, incorporated herein by reference.

Figure 9:
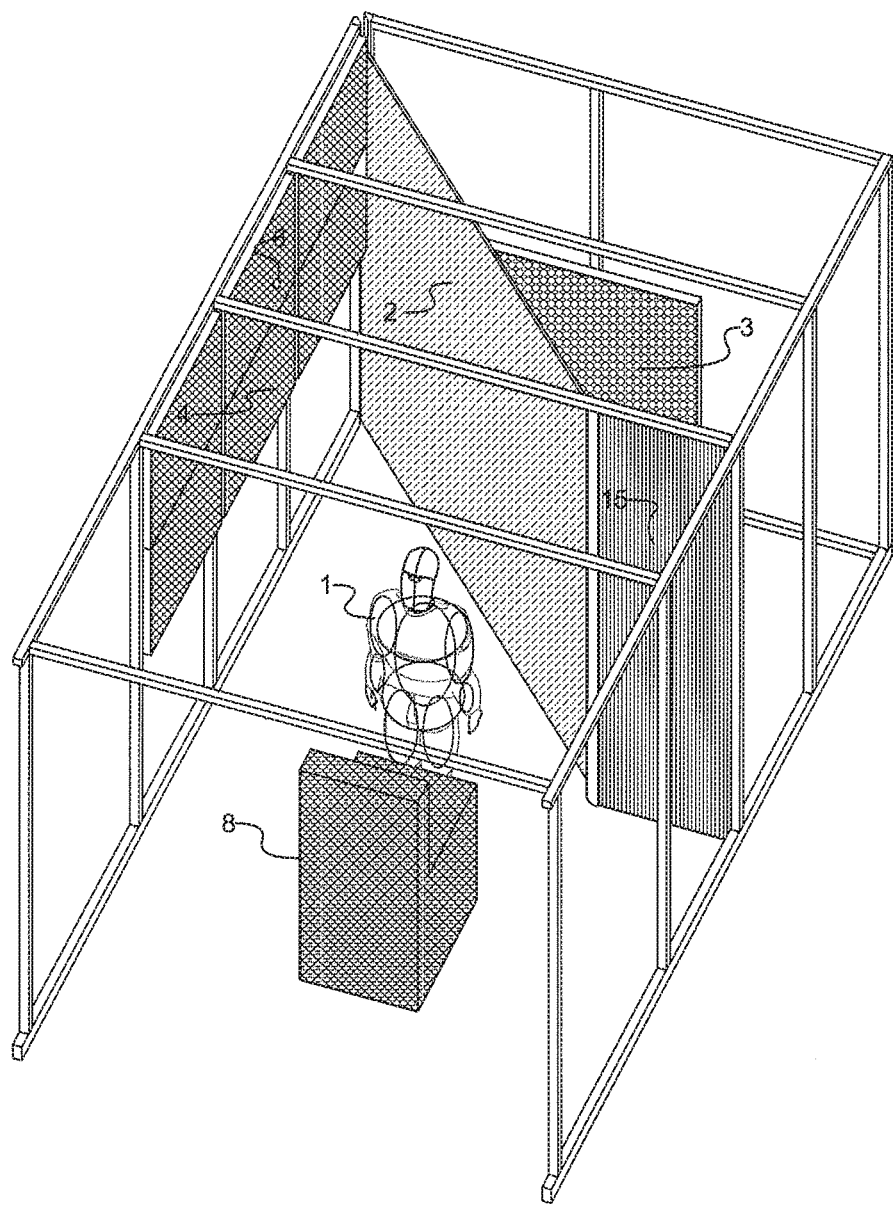
FIG. 9 illustrates a perspective view of a module with a communication system, with a two-way mirror positioned vertically with an image display device positioned behind the two-way mirror, according to some embodiments.

FIG. 9 is a perspective view, according to some embodiments, of a Module with user 1 looking toward a two-way mirror 2. A side wall 4 has a camera 6 imbedded in the wall. An image display device 3 is positioned behind the two-way mirror 2. A door 15 provides access to the area with the image display device 3. The image display device 3 is illustrated as a flat screen, vertically mounted in the Module, ahead of where the two-way mirror 2 is attached at side wall 4. According to some embodiments, the image display device 3 includes the other equipment, including processor, and other equipment and components connected to the screen, to power the screen, and enable the rendering of a display image on the screen that is projected through the two-way mirror 2. According to other embodiments, the screen may be a curved flat screen. Also, the screen in the image display device 3 may be a standard two-dimensional screen, or high-definition, or use OLED (organic light emitting display) or other display and projecting display technology.

According to some embodiments, the image display device 3 may also include a speaker embedded with the screen, to broadcast sound towards the user 1. The Module may also be equipped with sensors that could also be embedded in the side wall 4 or in the image display device to detect the presence of a user 1 in the Module. The detection of a presence of the user 1, may prompt lighting installed in the Module to turn on, and may prompt the image display device 3 to begin running, and rendering the display image on the screen. An example of other technology involved in detecting a presence, according to some embodiments, is described in the '754 patent, at col. 11, line 4 to col. 12, line 14, incorporated herein by reference. An example of lighting the user 1, according to some embodiments, is described in the '064 patent, at FIG. 27-30, and col. 12, lines 1 to 26, incorporated by reference herein.

Figure 10:
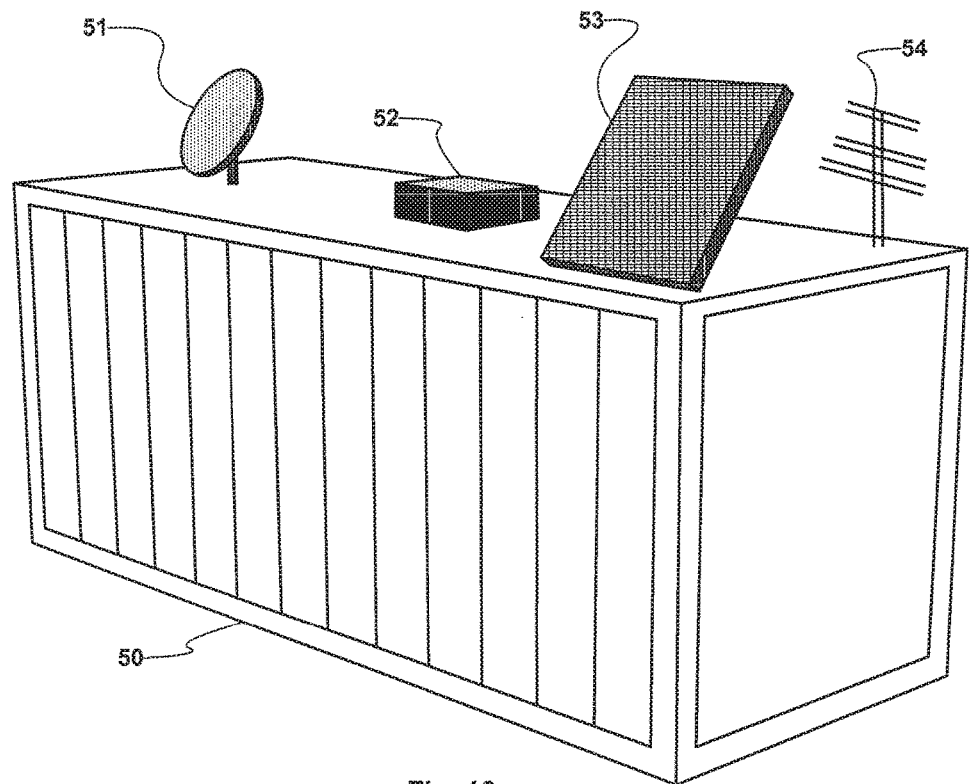
FIG. 10 illustrates a communication system contained in a shipping container, according to some embodiments.

FIG. 10 illustrates a shipping container 50 that may house the Module, according to some embodiments. The shipping container 50 may be an 8'×20' standard size. The Module may be powered by electricity from a solar panel 53, or other power source. The Module may have heating and cooling from an HVAC unit 52. The Module may have an antenna 54 for receiving 4G LTE or other wireless network services. The Module may have a satellite dish 51 for transmission from a satellite.

Figure 11:
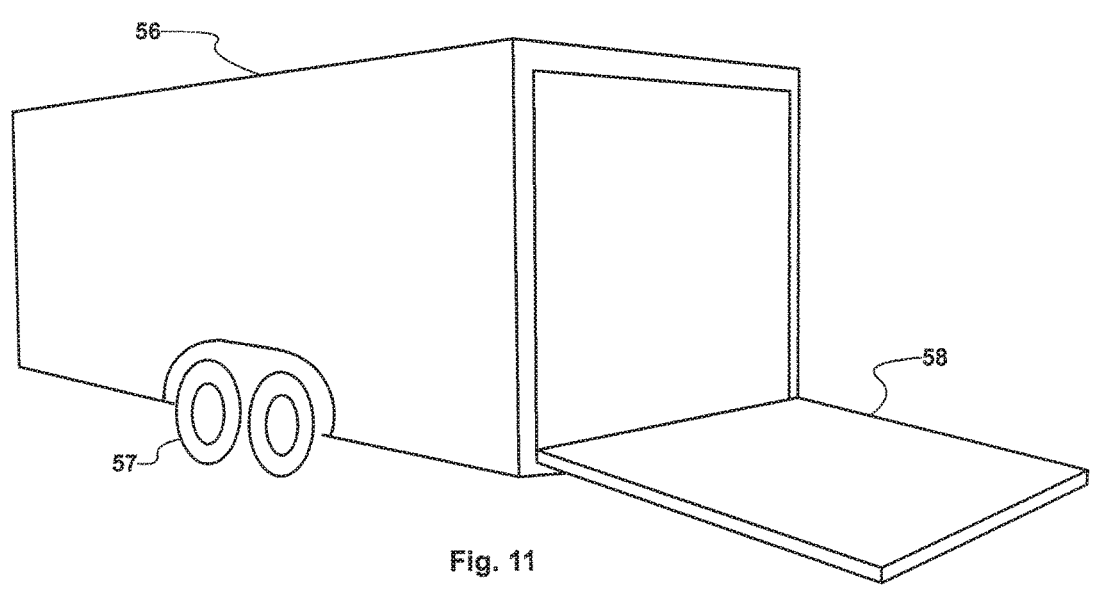
FIG. 11 illustrates a communication system contained in a trailer, according to some embodiments.

FIG. 11 illustrates a trailer 56 that may house the Module, according to some embodiments. The trailer 56 may be an 8½' wide trailer at a standard length of 24'. The trailer 56 may have a torsion axil 57 to minimize vibration to the Module during transportation. The trailer 56 may have a door 58 that hinges at the bottom to provide a ramp for access that may be an acceptable grade for wheel chair access.

Figure 12:
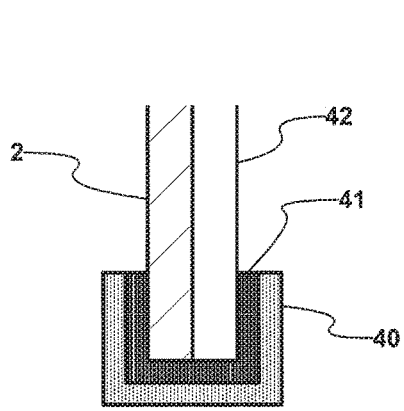
FIG. 12 illustrates a two-way glass mirror laminated to a clear glass panel placed in a metal channel with a rubber bumper, according to some embodiments.

FIG. 12 illustrates a two-way mirror 2, according to some embodiments. Two-way mirrors may also be referred to as a semi-reflective glass panel or a beam-splitter, laminated to a clear glass panel 42. In one embodiment, the two-way mirror may be placed in a rubber U-channel extrusion 41 with this placed in a metal U-channel 40. This combination of the rubber extrusion 41 and the metal channel 40 may protect the edges of the two-way mirror 2, for example, during transportation. In other embodiments, the two-way mirror 2 is laminated to the clear glass panel 42 and both are placed in the rubber U-channel extrusion 41. In yet some other embodiments, the clear glass panel may provide added protection for the two-way mirror 2. Laminating the clear glass panel 42 to the two-way mirror 2 provide structural support for the two-way mirror 2 given the large physical size of the two-way mirror 2 for filling the width and height of the Module. The two-way mirror may be 7' to 8' high and may be 8' to 9' wide.

Figure 13:
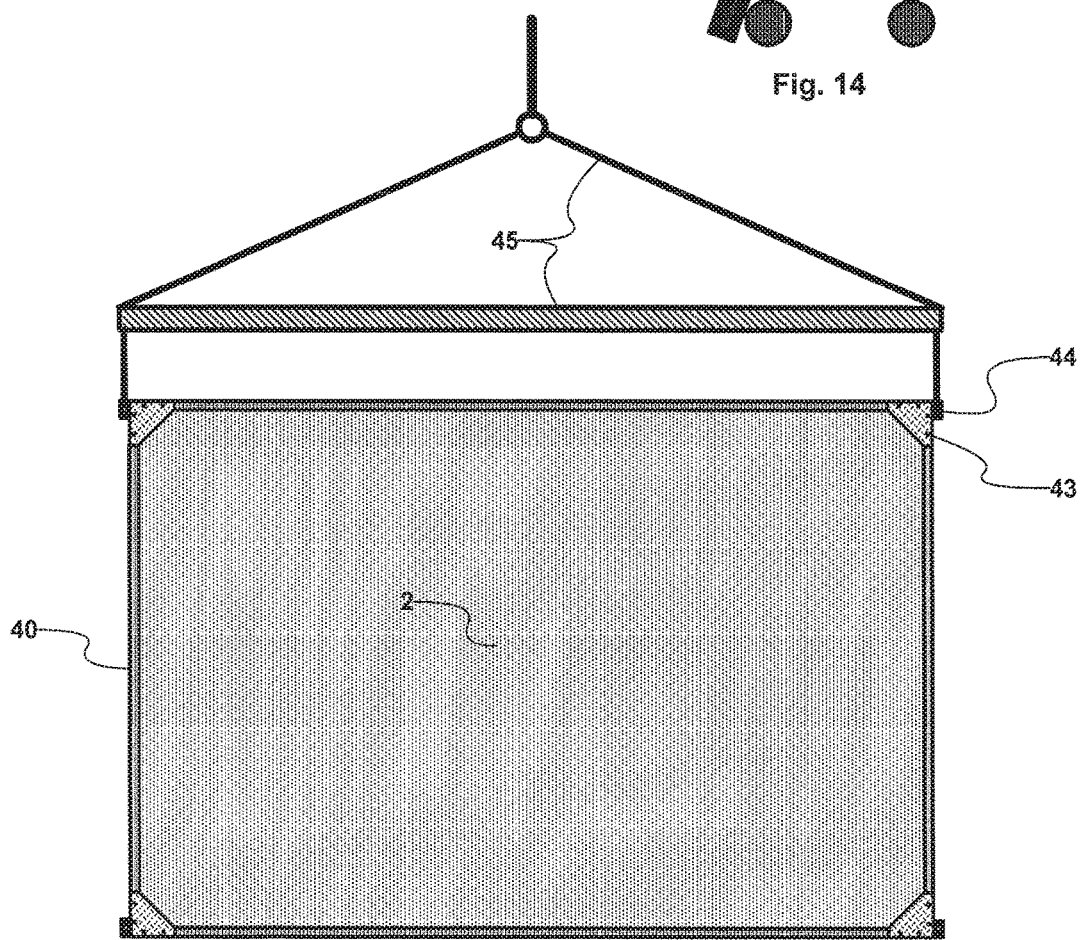
FIG. 13 illustrates a lifting mechanism attached to the metal structure surrounding a laminated two-way mirror for the purpose of lifting the panel, according to some embodiments.

FIG. 13 illustrates a lifting mechanism 45 for lifting the two-way mirror 2, according to some embodiments. The two-way mirror 2 is enclosed in metal channels 40 with corner brackets 43 and metal connectors 44. The lifting mechanism 45 is connected to the metal connectors 44 for lifting the two-way mirror 2. The lifting mechanism 45 may be used in a fabrication facility to lift and place the two-way mirror 2 within the structure of the Module, such as a prefab room, trailer or shipping container.

Figure 14:
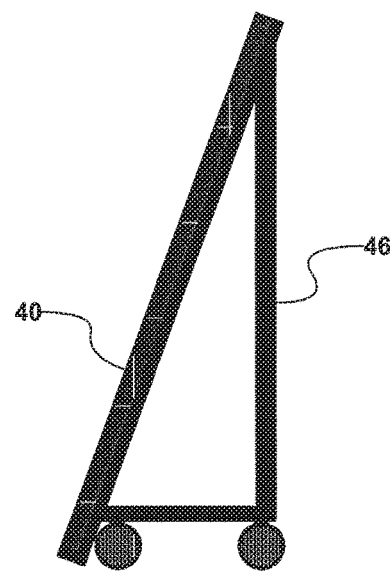
FIG. 14 illustrates a glass cart to be used to move the two-way mirror structure, according to some embodiments.

FIG. 14 illustrates a dolly 46 for holding the two-way mirror in frame 40, according to some embodiments. This dolly may be used to move the two-way mirror in frame 40 within a location for installation.

Figure 15:
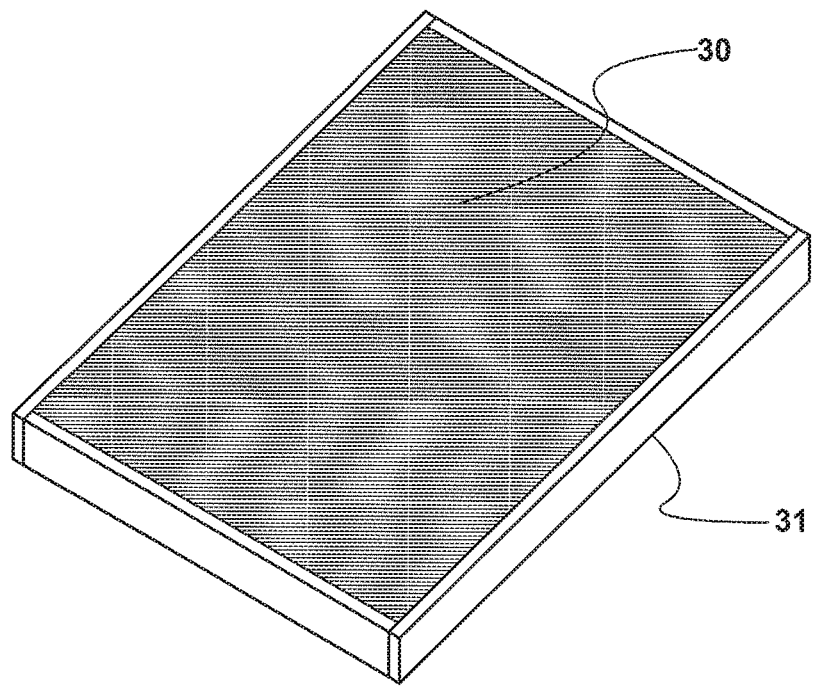
FIG. 15 illustrates a form to be used for stretching semi-reflective film on a frame, according to some embodiments.

FIG. 15 illustrates frame 31 with internal panel 30 that may be used to stretch a semi-reflective film, according to some embodiments. The frame 31 may be wood or other material that will allow for the penetration of staples, screws or other fixing devices. The internal panel may be plywood, MDF, plastic, corrugated aluminum panels or other rigid flat panels.

According to some embodiments, the two-way mirror comprises a very large semi-reflective surface filling the height and a portion of the width of a Module. A semi-reflected glass two-way mirror laminated to a clear glass panel may weigh 800 to 1,000 pounds. In some applications for some embodiments, a lightweight semi-reflective surface may be advantageous. It may be possible to use a semi-reflective film, such as type of Mylar film. Existing methods for stretching film are not practical due to the space and equipment involved in the usage of a truss and specialist clamps on the film. A method of stretching a film to fill the interior of a Module, according to some embodiments of the present invention, addresses this problem.

Figure 16:
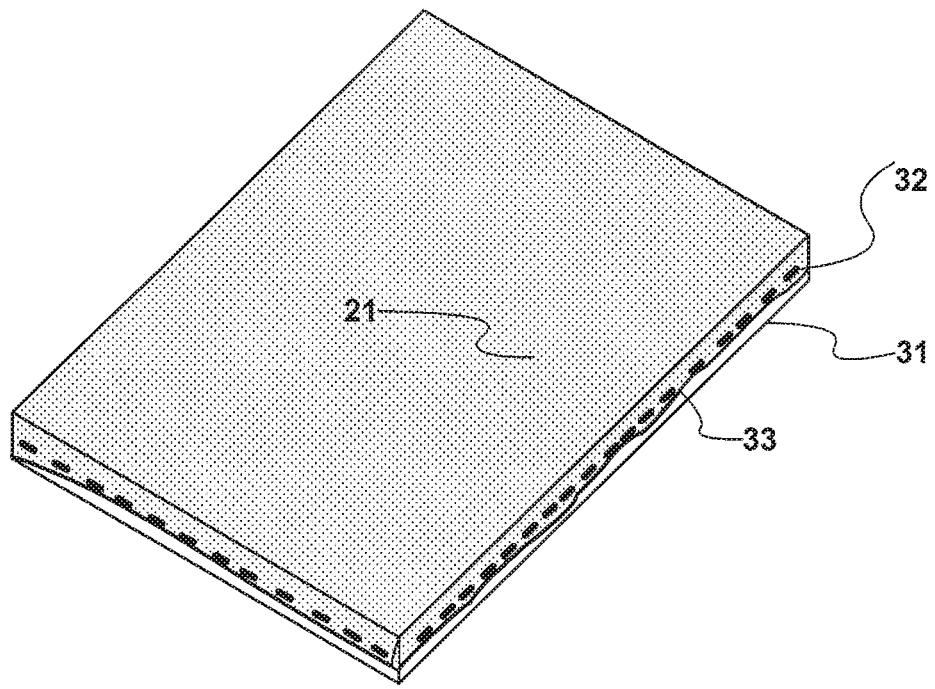
FIG. 16 illustrates semi-reflective film stretched over a form and held in position with staples around the edges, according to some embodiments.

FIG. 16 illustrates a sheet of semi-reflective film 21 stretched over a frame 31 and secured in place with staples 32, according to some embodiments. The staples 32 may be placed with a manual stapler or a dedicated staple gun. The staples 32 may be a size and strength to withstand the forces of the stretched film 21. The staples 32 may be in the form of nails or other type of penetrating objects to securely fix the film 21 to the structure 31. The film 21 may be cut along the edge 33 outside of the staples 32.

FIG. 17 illustrates a detail of the form for stretching semi-reflective film 21, according to some embodiments. The form is comprised of a frame structure 31 and an internal panel 30 held in position by brackets 34.

FIG. 18 illustrates a metal U-channel 35, such as a size 2" width with 1" legs, according to some embodiments. The U-channel 35 may have holes 36 spaced through the length of the metal extrusion. Strips of material 38 may be adhered along the length of the U-channel 35. The strips of material 38 may have an outwardly facing surface that would be adhesive, such as a two sided tape. When the metal U-channel would be placed in position and making contact with the semi-reflective film 21, it would make a permanent bond to hold the film in position. Alternatively, the strips of material 38 may have an outwardly facing surface that would grip the semi-reflective film 21, such as a rubber surface. This type of strip of material 38 would securely hold the semi-reflective film 21 from moving when the metal U-channel 35 is held in position, but would allow for the film 21 to be removed and replaced when a replacement sheet of the semi-reflected film 21 is needed.

FIG. 19 illustrates the metal U-channel 35 mounted to the frame 31 using screws 39, according to some embodiments. Once the metal U-channel 35 is screwed into position, a drill is used to drill through the holes 36 in the metal U-channel 35 to extend the holes through the frame 31 to be exposed through holes 49. The completed beam-splitter panel of the frame structure 31 with the internal panel 30 covered with the semi-reflective film 21 and the metal U-channel 35 frame will be ready for installation in a Module or shipping to the location for the assembly of a Module.

The Module may be designed to have a structure comprised of a floor, two side walls and ceiling with surfaces ready for acceptance of the beam-splitter panel. The completed beam-splitter panel may be placed in position within a Module to have the surrounding metal U-channel structure 35 of the beam-splitter panel to fit snugly within the provided space between the floor, two side walls and the ceiling. The beam-splitter panel will then be secured into position with bolts 37 passing through the holes 49 of the frame structure and the holes of the metal U-channel structure 35 to extend into the Module structure of the floor, two side walls and the ceiling.

FIG. 20 illustrates the beam-splitter panel bolted into position within the Module structure of the floor, two side walls and ceiling with bolts 37, according to some embodiments. With the beam-splitter panel securely in place it then will be possible to remove the internal panel 30 by removing the brackets 34. The semi-reflective film 21 will remain stretched since the frame structure 31 and the metal U-channels will be securely fixed to the floor, two side walls and ceiling of the Module. It is this usage of the structure of the Module that will make it possible to achieve a stretched semi-reflective film 21 without a bulky truss structure.

Figure 21:
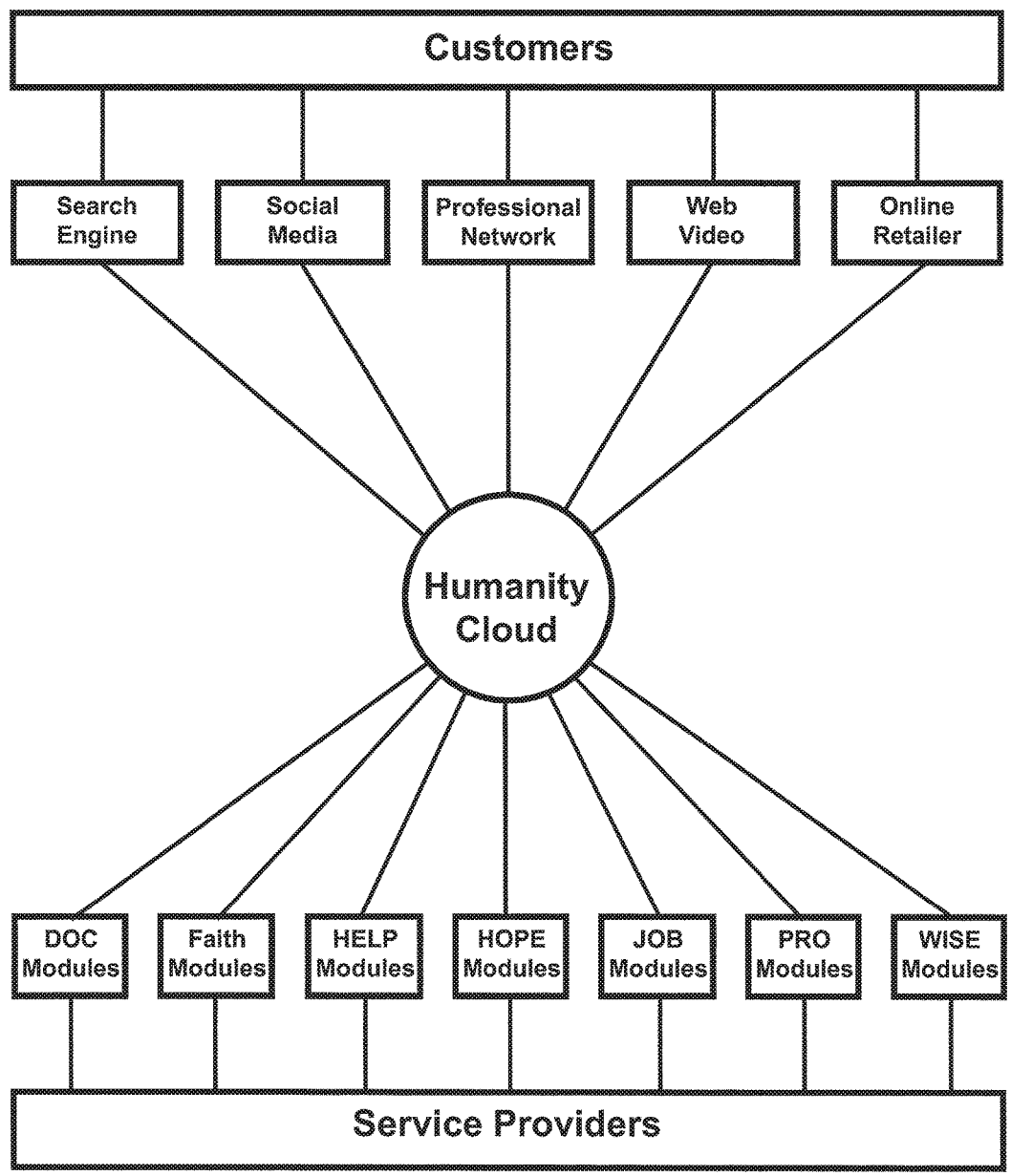
FIG. 21 illustrates a process for connecting customers with service providers through a cloud based network solution, according to some embodiments.

FIG. 21 illustrates a process for the present invention of the Modules to connect customers with service providers, according to some embodiments. The customers may go online to search for services that could be provided through the Modules. The customers may go to an online search engine. The customers may go to a social media website or service. The customers may go to a professional network website or service. The customers may go to a web video-conferencing site or service. The customers may to an online retailer. The online sources for locating a service for customers will be connected to the Humanity Cloud to make reservations with service providers at Modules. The Modules, according to some embodiments, could include any one or more of DOC Modules, Faith Modules, HELP Modules, HOPE Modules, JOB Modules, PRO Modules, WISE Modules or other Modules for other applications. The Modules may be owned by a number of merchant builders, real estate operators or investors. The Modules may be operated under a franchise business model. The service providers may operate as independent professionals or through professional organizations. The service providers may transmit from home offices, professional buildings, call centers or other places of business.

Other examples of applications run by Service Providers, according to some embodiments of the present invention, with technology enabling restricted access, and the provision of services, and transactions to one or many users, are described in the '754 patent, at col. 7, line 5 to col. 9, line 45, all of which is incorporated herein by reference.

FIG. 22 illustrates a process for customers to search for services providers ("Service Providers") to deliver their services at Modules, according to some embodiments. The customer may go on the internet to a company, such as an e-commerce company, to search for a service to be delivered at a Module. The company would be networked to the Humanity Cloud to have up-to-the-minute availability of the schedules for Modules and Service Providers. The customer will be able to select a service through the Online Company that will be confirmed by the Humanity Cloud.

FIG. 23 illustrates a process for customers to make reservations for services at Modules, according to some embodiments. Customers select to make a reservation online at the website of a company. The customers may use a credit card or other identification/payment card to hold a reservation. The company passes the details of the time, date and location for the service and the card details for the reservation to the Humanity Cloud. The Humanity Cloud passes the location information to the Module Owner and selected service to the Service Provider.

FIG. 24 illustrates a process for conducting the service at Modules, according to some embodiments. The customer may go to the location of the selected Module and present the credit card or other identification that was used to make the reservation. If the Module is unmanned, the customer will use the credit card or other identification at a card reader or other electronic identification system to get certified for access to the Module. The live video connection between the Module with the customer and the transmission system for the Service Provider will be automatically connected by the Humanity Cloud.

FIG. 25 illustrates a process for charging the Customer for the service provided at the Module, according to some embodiments. The Humanity Cloud will charge the credit card or other payment method used for the reservation made by the Customer. Upon receipt of the payment, the Humanity Cloud will pay the company a commission for the customer reservation. The Humanity Cloud may transfer payment to the Module Owner for the time used at the Module. The Humanity Cloud may transfer payment the Service Provider for the service.

According to some embodiments, examples of charging payment and providing services, including delivery of tangibles, is described in the '754 patent, including at col. 12, line 15 to col. 19, line 67, incorporated herein by reference.

FIG. 26 illustrates a process for charging the Service Provider for the time to meet with the customer at the Module, according to some embodiments. This payment process may apply when a Service Provider selects to provide their service at no charge to the customer with the objective of securing an order for products or services. The Humanity Cloud may process a charge to the Service Provider for the meeting with a customer. The Service Provider may pay the Humanity Cloud for the meeting. The Humanity Cloud may pay the company a commission for making the reservation. The Humanity Cloud may pay the Module Owner for the time in using the Module.

Figure 27:
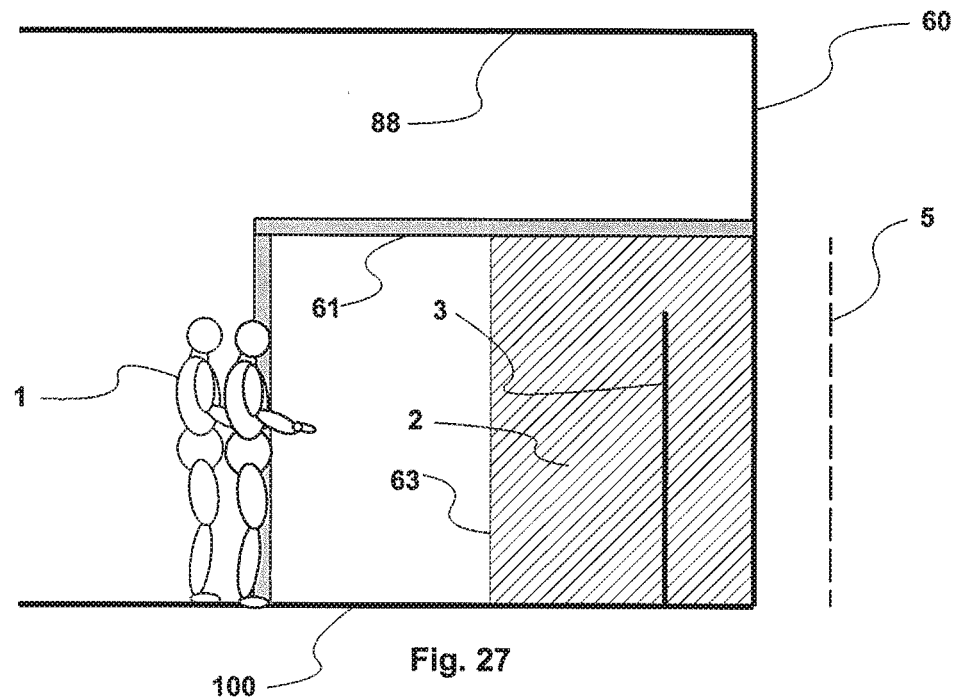
FIG. 27 illustrates a side view of a configuration of a module and system, according to some embodiments.

FIG. 27 illustrates a side view of the present invention with a user 1 viewing an image display device 3 positioned behind a two-way mirror 2 with a superimposed reflected image 5, according to some embodiments. There may be a vertical covering 63 on the front edge of two-way mirror 2. The two-way mirror 2 may extend from the floor 100 to a ceiling 61. The embodiment of the present invention may be within a room with a back wall 60 and a higher ceiling 88.

Figure 28:
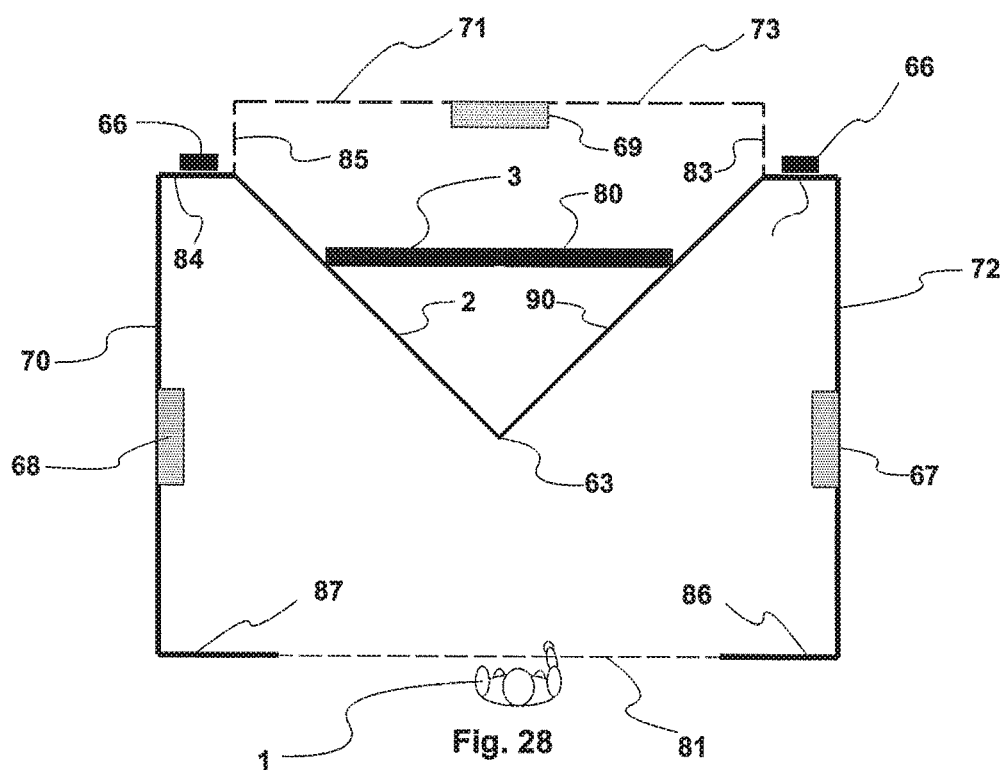
FIG. 28 illustrates a plan view of a configuration of a module and system with two two-way mirrors, according to come embodiments.
Figure 29:
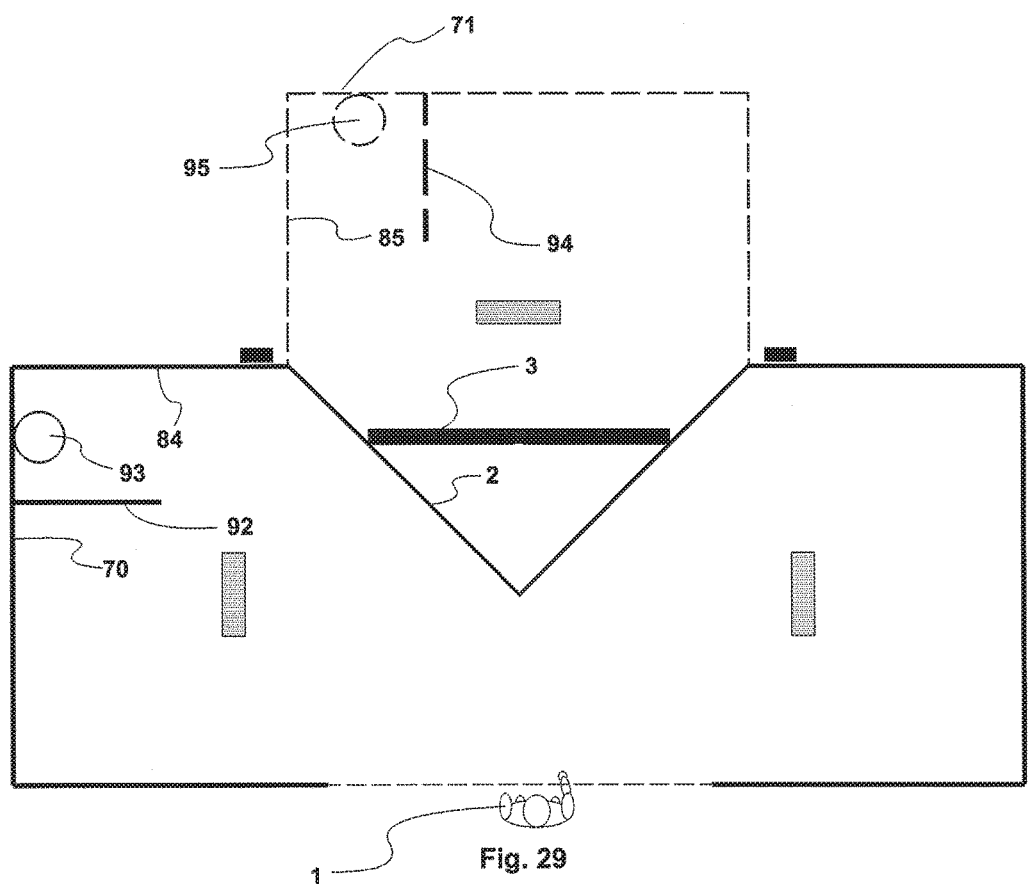
FIG. 29 illustrates a plan view of a module and system with two two-way mirrors, and two side regions on either side of the observation zone, according to some embodiments.

Some embodiments of the Modules may include two two-way mirrors, as illustrated in FIGS. 28-29. FIG. 28 illustrates a plan view of an embodiment of the present invention with a two-way mirror 2 and a second two-way mirror 90. The two-way mirror 2 reflects a side wall 70 that is superimposed to a plane 71 by the two-way mirror 2 to appear behind an image display device 3 as viewed by a user 1. The second two-way mirror 90 reflects a side wall 72 that is superimposed to a plane 73 by the two-way mirror 2 to appear behind an image display device 80 as viewed by a user 1. There is a vertical connection 63 covering the connecting edges of the two-way mirrors 2 and 90. The two-way mirrors 2 and 90 are equidistant for their corresponding side walls 70 and 72 so that the reflected planes 71 and 73 match to the same plane. An object 68 may be viewed by the user 1 as a reflection by the two-way mirror 2 to appear in the position of 69. A matching object 67 may be viewed by the user 1 as a reflection by the two-way mirror 90 to appear in the same position 69.

The user 1 may be positioned up to a viewing line 81. The viewing line 81 is restricted by opaque vertical panels 87 on the left and 86 on the right that restricts the user 1 from viewing beyond the length of the viewing line 81. Within the length of the viewing line 81 the user 1 will not see a reflection of themselves in the two-way mirrors 2 or 90. The present invention may have speakers 66 within the enclosure.

The embodiment of the present invention may incorporate a back wall extension 84 extending from the left edge of the two-way mirror 2 to the side wall 70. When reflected in the two-way mirror 2 as viewed by the user 1 the back wall extension 84 will appear as a reflected wall section 85. The reflected side wall 70 will appear as a superimposed reflection that is a further distance from the left edge of the two-way mirror 2 equal to the width of the back wall extension 84.

FIG. 29 illustrates an embodiment of the present invention with a user 1 viewing an image display device 3 through a two-way mirror 2 with a side wall 70 reflected to be superimposed to appear in a plane 71. In this illustration the back wall extension 84 is extended greater than the back wall extension 84 in FIG. 28. The distance to the side wall 70 from the left edge of the two-way mirror 2 so that the reflected back wall extension 84 appears as a reflection off the two-way mirror 2 as a plane 85. The reflected plane 71 of the side wall 70 will appear the distance from the two-way mirror equal to the distance of the reflected plane 71 so that the user 1 views the superimposed reflected plane 71 at a greater distance compared to FIG. 28.

There may be an opaque surface 92 in the zone in front of the side wall 70. The opaque surface may obscure an object 93 when viewed from the position of the user 1. The object 93 may be seen as a reflection 95 off the two-way mirror 2 with the opaque surface 92 reflected as an image 94, which does not obscure the view of the reflected object 95.

The display image rendered on the screen of the image display device 3 in FIG. 30, shows a non-light-emitting portion 100 and a light-emitting portion 100. The light-emitting portion 100 comprises an image of a person, and this image is viewed in the foreground, according to some embodiments, including, e.g., with one two-way mirror, as illustrated in FIG. 8, or through two two-way mirrors, as illustrated in FIGS. 28-29. The non-light-emitting portion 102 comprises a substantially black background. Reflections from the two-way mirror, the case of a single two-way mirror, or from both two-way mirrors in the alternative, are superimposed onto the non-light-emitting portion 100 of the display image. Those reflections appear as a backdrop to the light-emitting portion 100 of the display image when a user 1 views the display image through the single or double two-way mirrors that are positioned between the user 1 and the image display device 3.

As used herein, the terms "comprises," "comprising," "includes," "including," "has," "having," or any contextual variant thereof, are intended to reference a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

Further, spatially relative terms, such as "forward," "front," "back," "beneath," "below," "lower," "above," "upper," "side" and the like, may be used herein for ease of description to describe one element's or feature's relationship to another element or feature as illustrated in the figures. Spatially relative terms are intended to encompass different orientations of the device in use or operation, in addition to the orientation depicted in the figures. The Module, and system that is inside and connected to parts of the Module, may otherwise be oriented (rotated 90 degrees or at other orientations) and spatially relative descriptors used herein may likewise be interpreted accordingly.

Additionally, although steps or operations described herein may be presented in a specific order, this order may be changed in different embodiments. In some embodiments, to the extent multiple steps are shown as sequential in the preceding description, some combination of such steps in alternative embodiments may be performed at a same time. The sequence of operations described herein may be interrupted, suspended, or otherwise controlled by another process or system.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or terms. Language designating such non-limiting examples and illustrations includes, but is not limited to: "for example," "for instance," "e.g.," "etc.," "or the like," "in a representative embodiment," "in one embodiment," "in another embodiment," or "in some embodiments."

Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to the same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially similar results in correspondence to embodiments described herein, may be utilized according to their description herein. The appended claims are intended to include within their scope such processes, products, machines, articles of manufacture, assemblies, apparatuses, means, methods, or steps.

Persons of ordinary skill in the art may understand that all or a part of any steps in the method of using or installing the Module, the system in the Module, or any devices connected thereto or therein, in some embodiments may be implemented by, or include a program instructing relevant hardware. The program may be stored in a non-transitory computer-readable storage medium. When the program runs, the steps of the method embodiments are performed. The foregoing storage medium includes any medium that can store program code, such as a ROM, a RAM, a magnetic disk, or an optical disc.

Further, benefits, other advantages, and solutions to problems have been described herein with regard to some embodiments. However, any benefits, advantages, solutions to problems, or any component thereof that may cause any benefit, advantage, or solution to occur or to become more pronounced are not to be construed as critical, required, or essential features or components.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:
    an image display device comprising a screen, wherein the image display device is adapted to render, on the screen, a display image that comprises a light-emitting portion and a non-light-emitting portion; and a first two-way mirror disposed in front of the screen, wherein the display image is viewable in an observation zone disposed in front of the first two-way mirror;

wherein the first two-way mirror is adapted to superimpose onto the non-light-emitting portion of the display image, a reflection of a portion of a first side wall that borders the observation zone, when the display image projects through the first two-way mirror into the observation zone;

wherein the observation zone is adapted to accommodate a user therein, when the user is vertically upright inside the observation zone in a seated position or in a standing position;

wherein the observation zone is disposed in front of the first two-way mirror, horizontally between the first side wall and a second side wall opposite the first side wall, vertically beneath a ceiling that extends from the first side wall to the second side wall, and vertically above a floor that is opposite the ceiling and that extends from the first side wall to the second side wall;

wherein the reflection of the portion of the first side wall that is superimposed by the first two-way mirror over the non-light-emitting portion, comprises a backdrop to the light-emitting portion of the display image, wherein the backdrop provides an observable depth relationship for the light-emitting portion of the display image when the user views the display image along a line of vision that extends straight through the first two-way mirror to the screen; and wherein the first two-way mirror that is between the screen and the observation zone is angled at substantially 45 degrees around a vertical axis extending through the first two-way mirror to the ceiling, to partially face the portion of the first side wall that is reflected as the backdrop for the light-emitting portion of the display image; and wherein the screen is disposed in a vertical orientation behind the first two-way mirror, so that, when the user is inside the observation zone and facing a center of the first two-way mirror, the screen is closer to the user than a first side edge of the first two-way mirror, with the first side edge being a vertical edge of the first two-way mirror that is closest to the first side wall.

2. The system according to claim 1, wherein, when the light-emitting portion of the display image is an image of a person, the image of the person is viewed by the user in the observation zone, as a life-sized or near life-sized image of the person.

3. The system according to claim 1, further comprising an enclosure, wherein the observation zone is disposed inside the enclosure;

wherein the enclosure comprises the first side wall, the second side wall, the ceiling, the floor, and a back wall that extends from the first side wall to the second side wall;

wherein the back wall comprises a vertical plane extending from the floor to the ceiling, and the back wall is opposite the first two-way mirror;

wherein the user is in the observation zone when the user is inside the enclosure; and wherein, when the user is facing the first two-way mirror and the screen, the back wall is behind the user.

4. The system according to claim 3, wherein the enclosure is a shipping container, a trailer, a prefabricated structure, a motorized vehicle, or a room within a building.

5. The system according to claim 3, wherein the back wall comprises a light absorbing surface behind the user when the user is facing the first two-way mirror in the observation zone.

6. The system according to claim 1, further comprising a medical exam table, diagnostic medical equipment and data transmission system adapted to measure and communicate medical results of patient evaluations to operators in remote locations.

7. The system according to claim 1, further comprising lighting adapted to illuminate the user in the observation zone.

8. The system according to claim 1, wherein the first two-way mirror comprises a laminated glass panel, comprising a pane of glass with a semi-reflective property on an outside surface closest to the user in the observation zone.

9. The system according to claim 1, wherein the first two-way mirror comprises a stretched semi-reflective film that, once mounted, extends from the floor to the ceiling.

10. The system according to claim 1, further comprising a second two-way mirror adjacent to the first two-way mirror, and oppositely angled to the first two-way mirror, so that the second two-way mirror reflects a portion of the second side wall, defining a corner with the first two-way mirror;

wherein the corner is substantially centered with the screen that is behind the corner; and wherein, when the user is centered inside the observation zone, in front of the corner, the backdrop comprises a first reflection of a portion of the first side wall, and, adjacent to the first reflection, a second reflection of a portion of the second side wall.

11. The system according to claim 10, wherein the screen comprises a first screen and a second screen adjacent to the first screen and substantially co-planar with the first screen; and wherein the display image comprises a first display image rendered on the first screen, and a second display image rendered on the second screen.

12. The system according to claim 1, wherein the display image comprises a pre-recorded video.

13. The system according to claim 10, wherein the first side wall substantially matches the second side wall, such that, to the user in the observation zone, the backdrop appears continuous across an outer surface of the first two-way mirror to the second two-way mirror.

14. The system according to claim 1, wherein the screen is adapted to render the display image by playing a video that is captured live of an operator at a remote location outside the observation zone; and wherein the system further comprises:
    a communications network coupled to the screen, that is adapted to transmit the video from the remote location to the screen in the observation zone; and
    a camera embedded at the portion of the first side wall reflected by the first two-way mirror, with a field of view adapted to capture a live video of the user in the observation zone that is reflected back by the first two-way mirror into the camera; and
    wherein the camera is coupled to the communications network, and the communications network is further adapted to transmit the live video captured by the camera from the observation zone to a display device in the remote location.

15. The system according to claim 14, further comprising:
a speaker disposed in the observation zone adapted to broadcast audio from the remote location into the observation zone;
a microphone disposed in the observation zone adapted to capture sound in the observation zone;
wherein the speaker, and the microphone are coupled to the communication network; and
wherein the communication network is adapted to transmit the audio and the video from the remote location to the speaker and the screen, and transmit sound from the observation zone to the remote location; and
wherein the communication network is operable in a full duplex-mode, reducing significant interruptions or pauses caused by the sound captured by the microphone, onto the audio transmitted and broadcasted into the observation zone.

16. A method comprising:
rendering, on a screen that is disposed behind a two-way mirror, a display image that comprises a light-emitting portion and a non-light-emitting portion, wherein the display image is viewable in an observation zone that is disposed in front of the two-way mirror; and
superimposing, by the two-way mirror, onto the non-light-emitting portion of the display image, a reflection of a portion of a first side wall that borders the observation zone, as the display image is projected through the two-way mirror into the observation zone;
wherein the observation zone is adapted to accommodate a user therein, when the user is vertically upright inside the observation zone in a seated position or in a standing position;
wherein the observation zone is disposed in front of the two-way mirror, horizontally between the first side wall and a second side wall opposite the first side wall, vertically beneath a ceiling that extends from the first side wall to the second side wall, and vertically above a floor that is opposite the ceiling and that extends from the first side wall to the second side wall;
wherein the reflection of the portion of the first side wall that is superimposed by the two-way mirror over the non-light-emitting portion, comprises a backdrop to the light-emitting portion of the display image, and the backdrop provides an observable depth relationship for the light-emitting portion of the display image when the user views the display image along a line of vision that extends straight through the two-way mirror to the screen;
wherein the two-way mirror, that is between the screen and the observation zone, is angled towards the first side wall along a vertical axis extending through the two-way mirror towards the ceiling, to reflect the portion of the first side wall as the backdrop for the light-emitting portion of the display image; and
wherein the screen is disposed in a vertical orientation behind the two-way mirror, so that, when the user is inside the observation zone and facing a center of the two-way mirror, the screen is closer to the user than a first side edge of the two-way mirror, with the first side edge being a vertical edge of the two-way mirror that is closest to the first side wall.

17. The method according to claim 16, wherein the non-light-emitting portion comprises a substantially black background.

18. The method according to claim 16, wherein the observation zone comprises an enclosure, wherein the enclosure comprises the first side wall, the second side wall, the floor, the ceiling, and
wherein the method further comprises:
detecting, with a detection device disposed in the observation zone, whether the user has entered or left the enclosure, according to a pre-programmed or artificial intelligence process comprising video recognition, speech recognition, motion detection or other presence analysis of the user;
wherein detecting that the user has entered the enclosure is performed with a detection device coupled to the screen;
wherein the detection device activates the screen to start rendering the display image, or to establish a live video transmission to a remote location, with a communications network coupled to the detection device and the screen; and
wherein the detection device comprises a motion sensor, a heat sensor, a camera, or a pressure sensor disposed in or under the first side wall, second side wall, ceiling, or floor.

19. The method according to claim 16, further comprising:
capturing an image of the user in the observation zone with a camera disposed at the portion of the first side wall that is reflected by the two-way mirror, wherein a positioning of the camera relative to the two-way mirror adapts the two-way mirror to reflect the image of the user into the camera; and
transmitting, with a communication system coupled to the camera, the image of the user in the observation zone to an operator at a remote location outside the observation zone.

20. The method according to claim 19, wherein the display image comprises a video of the operator at the remote location;
wherein the method further comprises:
transmitting, with the communication system, the video from the remote location to the screen in the observation zone, while the image of the user is being transmitted by the communication system to a display system at the remote location.

21. The method according to claim 20, further comprising:
broadcasting a sound from the remote location into the observation zone on a speaker disposed in the observation zone; and
capturing sound in the observation zone with a microphone disposed in the observation zone;
wherein the speaker and the microphone are coupled to the communication system; and
wherein the transmitting comprises:
transmitting, with the communication system, the video and audio of the operator at the remote location to the screen and the speaker in the observation zone, while the image and sound from the observation zone is being transmitted by the communication system to the remote location.

22. A system, comprising:
an image display device comprising a screen, wherein the image display device is adapted to render, on the screen, a display image that comprises a light-emitting portion, a first non-light-emitting portion, and a second non-light-emitting portion; and a plurality of two-way mirrors disposed in front of the screen, wherein the display image is viewable in an observation zone disposed in front of the plurality of two-way mirrors;

wherein the plurality of two-way mirrors comprises a first two-way mirror, and a second two-way mirror adjacent to the first two-way mirror;

wherein, as the display image from the screen is viewed by a user in the observation zone, through the plurality of two-way mirrors:
 the first two-way mirror is adapted to superimpose, on the first non-light-emitting portion of the display image, a first reflection of an interior of a first side region disposed on a first side of the observation zone; and
 the second two-way mirror is adapted to superimpose, on the second non-light-emitting portion of the display image, a second reflection of an interior of a second side region disposed on a second side of the observation zone, wherein the second side region is opposite the first side region;

wherein the observation zone is adapted to accommodate a user therein, when the user is vertically upright inside the observation zone in a seated position or in a standing position;

wherein the observation zone is disposed in front of the plurality of two-way mirrors, horizontally between the first side region and the second side region, vertically beneath a ceiling that extends from the first side region to the second side region, and vertically above a floor that is opposite the ceiling and that extends from the first side region to the second side region;

wherein the first two-way mirror is angled around a vertical axis extending through the first two-way mirror to the ceiling, so that a reflective surface on the first two-way mirror partially faces the interior of the first side region;

wherein the second two-way mirror is oppositely angled to the first two-way mirror, so that a reflective surface on the second two-way mirror partially faces the interior of the second side region;

wherein, the first two-way mirror meets the second two-way mirror at a corner that is substantially centered with the screen behind the corner;

wherein the screen is disposed in a vertical orientation behind the plurality of two-way mirrors, so that, when the user is inside the observation zone and facing the corner, the screen is closer to the user in comparison to a first side edge of the first two-way mirror, and in comparison to a second side edge of the second two-way mirror, with the first side edge being a vertical edge of the first two-way mirror that is closest to the first side region, and the second side edge being a vertical edge of the second two-way mirror that is closest to the second side region;

wherein a superimposition of the first reflection onto the first non-light-emitting portion comprises a first backdrop for the light-emitting portion of the display image, and a superimposition of the second reflection onto the second non-light-emitting portion comprises a second backdrop for the light-emitting portion; and wherein the first backdrop with the second backdrop comprise an entire backdrop that provides an observable depth relationship, relative to the light-emitting portion of the display image, when the display image is viewed by the user in the observation zone, along a line of vision that extends straight through the plurality of two-way mirrors to the screen.

23. The system of claim 22, further comprising, in the interior of the first side region:
 an opaque surface; and
 an object behind the opaque surface;
 wherein the object is positioned behind the opaque surface, so that the opaque surface blocks the user in the observation zone from being able to directly view the object when facing the first side region; and
 wherein the first reflection comprises a reflection of the object, so that, when the user faces the plurality of two-way mirrors in the observation zone, the user views the reflection of the object in the first backdrop to the light-emitting portion of the display image.

* * * * *